(12) United States Patent
Oda

(10) Patent No.: US 7,978,227 B2
(45) Date of Patent: Jul. 12, 2011

(54) IMAGING APPARATUS WITH VIEWFINDER AND LIGHT SENSING DETECTOR

(75) Inventor: Katsunari Oda, Nara (JP)

(73) Assignee: Sony Corporation, Tokyo (JP)

(*) Notice: Subject to any disclaimer, the term of this patent is extended or adjusted under 35 U.S.C. 154(b) by 499 days.

(21) Appl. No.: 12/177,288

(22) Filed: Jul. 22, 2008

(65) Prior Publication Data

US 2009/0051784 A1 Feb. 26, 2009

(30) Foreign Application Priority Data

Aug. 21, 2007 (JP) ................. 2007-214400

(51) Int. Cl.
- *H04N 5/225* (2006.01)
- *H04N 5/235* (2006.01)
- *H04N 5/222* (2006.01)
- *G03B 13/02* (2006.01)
- *G03B 13/08* (2006.01)

(52) U.S. Cl. .............. 348/221.1; 348/341; 348/333.08; 348/362; 396/374; 396/386

(58) Field of Classification Search .............. 348/221.1, 348/341, 333.08, 333.09, 362; 396/374, 396/385, 386
See application file for complete search history.

(56) References Cited

U.S. PATENT DOCUMENTS

| | | | |
|---|---|---|---|
| 4,689,689 A * | 8/1987 | Saito et al. ................ 348/366 |
| 5,802,408 A | 9/1998 | Suda | |
| 5,873,003 A | 2/1999 | Inoue et al. | |
| 5,903,788 A | 5/1999 | Mukai et al. | |
| 7,071,987 B1 * | 7/2006 | Tanaka .......................... 348/362 |
| 7,400,827 B2 * | 7/2008 | Kawai et al. ................... 396/272 |
| 7,453,508 B2 * | 11/2008 | Iwase et al. ................... 348/335 |
| 7,583,892 B2 * | 9/2009 | Okumura ...................... 396/282 |
| 7,734,169 B2 * | 6/2010 | Mitsuo et al. ................ 396/373 |
| 7,734,170 B2 * | 6/2010 | Yagyu et al. ................... 396/386 |
| 2002/0176708 A1 | 11/2002 | Irie | |
| 2004/0090532 A1 | 5/2004 | Imada | |
| 2005/0259176 A1* | 11/2005 | Kyuma ......................... 348/362 |
| 2006/0127080 A1* | 6/2006 | Mori et al. .................... 396/121 |

FOREIGN PATENT DOCUMENTS

| | | |
|---|---|---|
| JP | 2001-133846 | 5/2001 |
| JP | 2005115145 A * | 4/2005 |

* cited by examiner

*Primary Examiner* — John M Villecco

(74) *Attorney, Agent, or Firm* — Oblon, Spivak, McClelland, Maier & Neustadt, L.L.P.

(57) ABSTRACT

An imaging apparatus, includes a viewfinder optical system for guiding an observation light beam to a viewfinder window, the observation light beam being output from an imaging optical system and then reflected from a main reflective surface, an imaging element for generating an image signal in response to the reception of the observation light beam, an exposure control unit for performing exposure control of the imaging element in response to the image signal from the imaging element, and a light sensing detector, arranged in the vicinity of the imaging element, for measuring light. The exposure control unit determines an exposure control value in the exposure control in response to a light measurement value provided by the light sensing detector if a predetermined condition is satisfied.

10 Claims, 17 Drawing Sheets

IMAGING APPARATUS WITH VIEWFINDER AND LIGHT SENSING DETECTOR

CROSS REFERENCES TO RELATED APPLICATIONS

The present invention contains subject matter related to Japanese Patent Application JP 2007-214400 filed in the Japanese Patent Office on Aug. 21, 2007, the entire contents of which are incorporated herein by reference.

BACKGROUND OF THE INVENTION

1. Field of the Invention

The present invention relates to an imaging apparatus such as a digital camera.

2. Description of the Related Art

Techniques for implementing a live-view function on a single-lens reflex camera are available. With the live-view function, time-series image of a subject are sequentially displayed on a liquid-crystal display, i.e., the images of the subject are displayed on a liquid-crystal display more like a moving image.

For example, Japanese Unexamined Patent Application Publication No. 2001-133846 discloses a camera that includes a live-view imaging element, separate from a photograph imaging element for image capturing (still image recording), arranged in the vicinity of a viewfinder optical system. A retractably movable reflective mirror is arranged along a viewfinder optical path close to an eyepiece lens. With the reflective mirror set to and retracted from the viewfinder optical path, an observation light beam from a subject is selectively directed to the eyepiece lens or to the live-view imaging element. The camera thus performs the live-view function using an optical image focused in response to the live-view imaging element.

SUMMARY OF THE INVENTION

During live-view displaying, the single-lens reflex camera uses as light measurement means an imaging element for receiving an observation light beam (live-view imaging element) to adjust a illuminance of a live-view image. More specifically, a control value Tv related to a shutter speed is modified in feedback control so that the illuminance of the image approaches a target value.

However, under relatively dark conditions or relatively light conditions, the illuminance of a screen may be substantially different from the target value thereof at the start of exposure control.

In such a case, a relatively long period of time is required to control a control output to a target value. More specifically, the camera takes a relatively long time to stabilize exposure control.

Such a problem arises not only at the start of the exposure control but also when a luminance of a subject changes sharply.

It is thus desirable to provide an imaging apparatus that reaches within a short period of time a stable state in the exposure control of the imaging element thereof receiving an observation light beam.

According to one embodiment of the present invention, an imaging apparatus includes a viewfinder optical system for guiding an observation light beam to a viewfinder window, the observation light beam being output from an imaging optical system and then reflected from a main reflective surface, an imaging element for generating an image signal in response to the reception of the observation light beam, exposure control means for performing exposure control of the imaging element in response to the image signal from the imaging element, and a light sensing detector, arranged in the vicinity of the imaging element, for measuring light. The exposure control means determines an exposure control value in the exposure control in response to a light measurement value provided by the light sensing detector if a predetermined condition is satisfied.

According to one embodiment of the present invention, an imaging apparatus includes a viewfinder optical system for guiding an observation light beam to a viewfinder window, the observation light beam being output from an imaging optical system and then reflected from a main reflective surface, a first imaging element for generating an image signal in response to the reception of the observation light beam, first exposure control means for performing exposure control of the first imaging element in response to the image signal from the first imaging element, a light sensing detector, arranged in the vicinity of the first imaging element, for measuring light, a second imaging element for generating an image signal in response to the reception of the light beam from the imaging optical system, and second exposure control means for calculating luminance of a subject in response to the image signal from the first imaging element, and performing exposure control of the second imaging element. The first exposure control means determines an exposure control value in the exposure control of the first imaging element in response to the light measurement value provided by the light sensing detector if a predetermined condition is satisfied. The second exposure control means determines the luminance of the subject in response to the image signal of the first imaging element exposure controlled by the first exposure control means, and performs the exposure control of the second imaging element in response to the luminance of the subject.

According to embodiments of the present invention, the time to reach a stable state in the exposure control using the imaging element receiving an observation light beam is shortened.

DESCRIPTION OF THE PREFERRED EMBODIMENTS

The embodiments of the present invention are described below with reference to the drawings.

Figure 1:
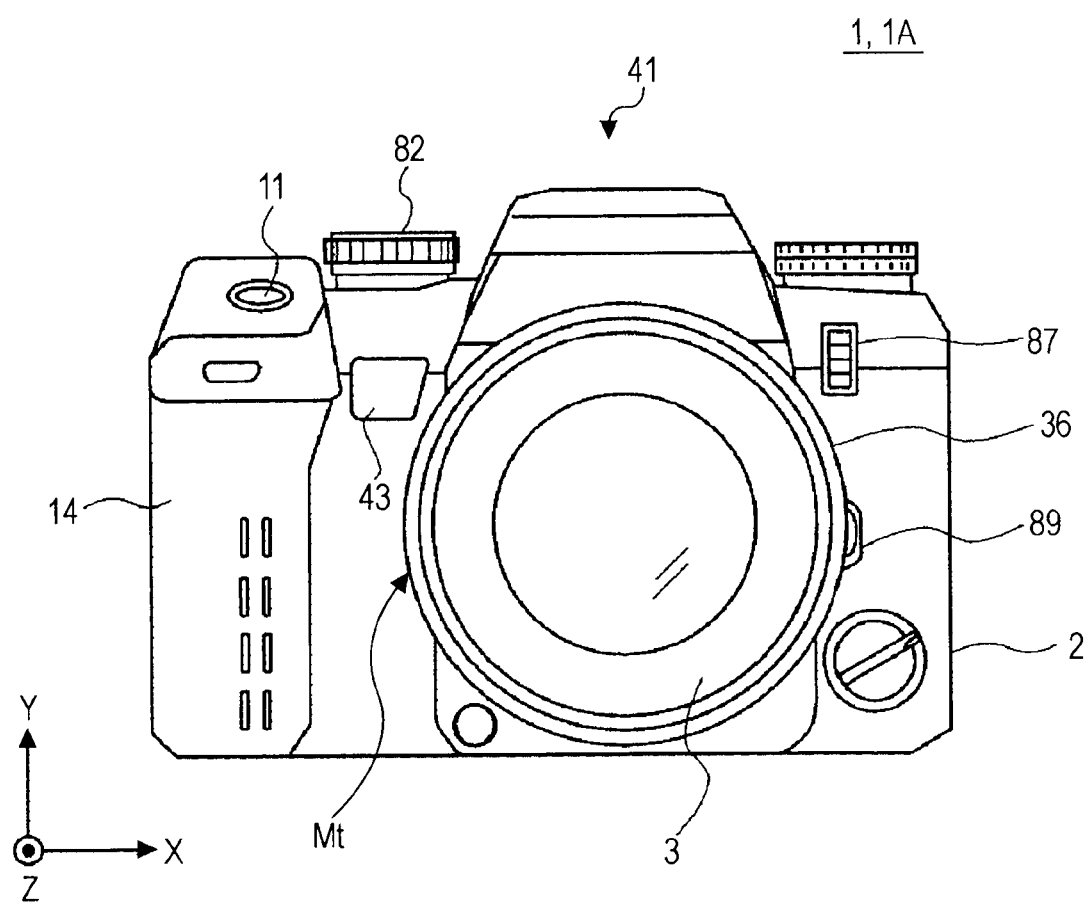
FIG. 1 is a front view of an imaging apparatus according to one embodiment of the present invention.
Figure 2:
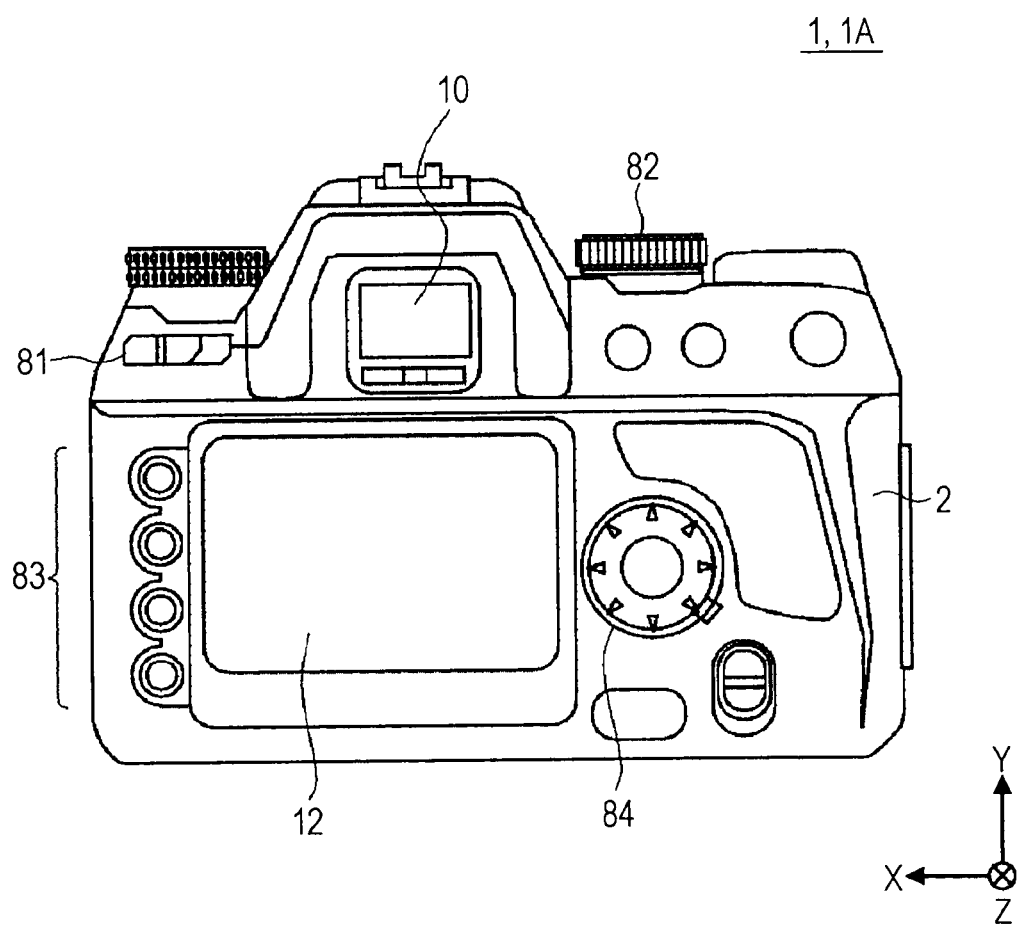
FIG. 2 is a rear view of the imaging apparatus according to one embodiment of the present invention.

FIGS. 1 and 2 are external views of an imaging apparatus 1 according to a first embodiment of the present invention. FIG. 1 is an external front view of the imaging apparatus 1 and FIG. 2 is an external rear view of the imaging apparatus 1. The imaging apparatus 1 is a lens-interchangeable, single-lens reflex digital camera.

As shown in FIG. 1, the imaging apparatus 1 includes a camera body 2. A replacement imaging lens unit 3 is removably loaded onto the camera body 2.

The imaging lens unit 3 includes a lens barrel 36 and a lens group 37 (see FIG. 3) arranged within the lens barrel 36, and a diaphragm. The lens group 37 includes a focus lens and the like, movable along an optical axis of the lens group 37.

The camera body 2 includes a ring mount Mt in the approximate center of the front thereof for receiving the imaging lens unit 3. The camera body 2 also includes in the vicinity of the ring mount Mt a loading button 89 that allows the imaging lens unit 3 to be loaded or unloaded.

The camera body 2 further includes a mode setting dial 82 on the left top portion thereof. The mode setting dial 82 selects and sets a variety of modes (such as photographing modes (a portrait photographing mode, a landscape photographing mode, a full-automatic photographing mode, etc.), a play mode for reproducing an image photographed, and a communication mode for exchanging data with an external apparatus).

The camera body 2 also includes on the front left portion thereof a grip 14 to be gripped by a user. A release button 11 for issuing a command to start an exposure operation is arranged on top of the grip 14. Arranged within the grip 14 are a battery container and a card slot. The battery container receives a battery such as lithium-ion battery as a power source for the camera. The card slot receives a memory card 90 (see FIG. 3) for recording image data of photograph images.

The release button 11 is a two-step detection button that detects a half-pressed state (S1 state) and a fully-pressed state (S2 state). When the release button 11 is half-pressed to the S1 state, a preparation operation (such as an auto-focus (AF) control operation) for acquiring a still image (photograph image) of a subject is performed. If the release button 11 is further pressed to the S2 state, a photographing operation for photographing image is performed. The photographing operation includes a series of steps, in which an imaging element 5 (to be discussed later) performs an exposure operation onto a subject image (optical image of a subject), and predetermined image processes are performed on an image signal resulting from the exposure operation.

As shown in FIG. 2, a viewfinder window (eyepiece window) 10 is arranged on the upper center portion of the rear surface of the camera body 2. Observing the subject through the viewfinder window 10, a user may view the optical image of the subject focused through the imaging lens unit 3 and perform a photographic framing of the subject. More specifically, the user can perform the photographic framing using the optical viewfinder.

With the imaging apparatus 1 of the first embodiment, the user can perform the photographic framing using a live-view image displayed on a rear monitor 12 (to be discussed later). By rotating a switching dial 87, the user switches between the photographic framing based on an optical viewfinder and the photographic framing based on a live-view displaying.

As shown in FIG. 2, the rear monitor 12 is arranged on the generally central portion of the rear side of the camera body 2. The rear monitor 12 may include a color liquid-crystal display (LCD). The rear monitor 12 displays a menus screen for setting photographing conditions and the like and reproduces and displays a photograph image recorded on the memory card 90 in a play mode. If the user selects the photographic framing determination based on the live view displaying rather than through the optical viewfinder, the rear monitor 12 displays as live-view images a plurality of images (i.e., moving images) acquired in time series by an imaging element 7 (to be discussed later).

A power switch (main switch) 81 is arranged on the left top portion of the rear monitor 12. The power switch 81 is a two-position slide switch. With the power switch 81 slid to an "OFF" position on the left side, the imaging apparatus is switched on. With the power switch 81 slid to an "ON" position on the right side, the imaging apparatus is switched off.

A direction selection key 84 is arranged to the right of the rear monitor 12. The direction selection key 84 includes circular operation buttons. Depending on a pressed position, the direction selection key 84 detects one of the eight directions, namely, upper, lower, left and right directions, right upper, left upper, right lower and left lower directions. In addition to the pressing in the eight directions, the direction selection key 84 also detects pressing of a pushbutton in the center thereof.

A setting button group 83 composed of a plurality of buttons for setting a menu screen and deleting an image is arranged to the left of the rear monitor 12.

Figure 3:
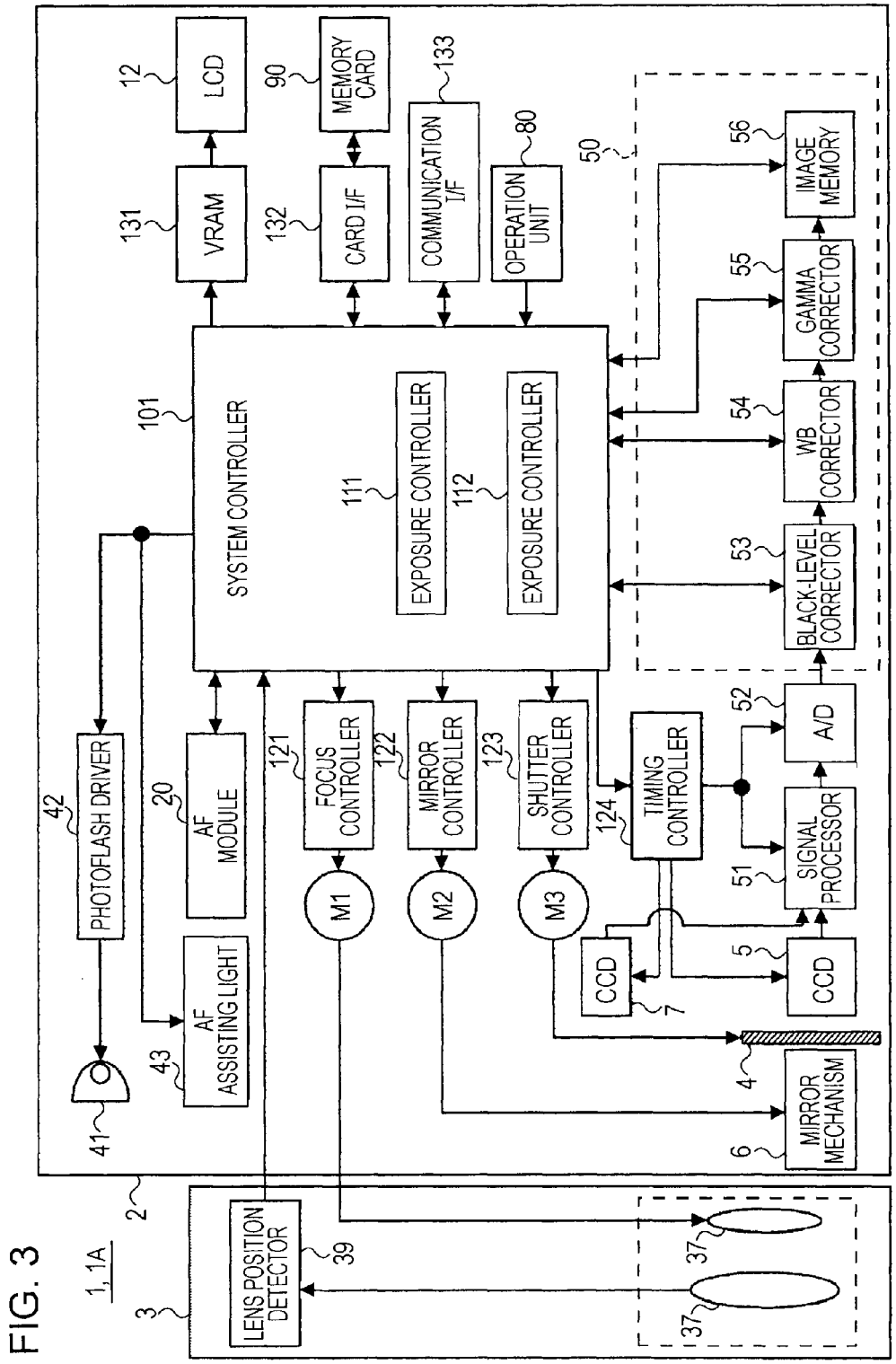
FIG. 3 is a functional block diagram of the imaging apparatus according to one embodiment of the present invention.

The functions of the imaging apparatus 1 are briefly described below with reference to FIG. 3. FIG. 3 is a block diagram illustrating the functions and structure of the imaging apparatus 1.

As shown in FIG. 3, the imaging apparatus 1 includes an operation unit 80, a system controller 101, a focus controller 121, a mirror controller 122, a shutter controller 123, a timing controller 124, a digital signal processor 50, etc.

The operation unit 80 includes a variety of buttons including the release button 11 (see FIG. 1), and switches. The system controller 101 performs a variety of processes in response to a user input operation to the operation unit 80.

The system controller 101, forming a microcomputer, includes a central processing unit (CPU), a memory, a read-only memory (ROM), etc. The system controller 101 reads a program stored on the ROM, and performs the variety of processes by executing the program with the CPU.

For example, the system controller 101 includes an exposure controller 111 and an exposure controller 112, each functionally embodied by performing the program.

The exposure controller 111 performs exposure control related to the imaging element 7 (to be discussed later). In an EVF (electronic viewfinder) mode (to be discussed later), the exposure controller 111 performs usually the exposure control on the imaging element 7 in response to an image signal from the imaging element 7. If a particular condition is satisfied (i.e., at the moment of a particular timing), the exposure controller 111 determines an exposure control value in the exposure control based on a light measurement value of a light sensing detector 79 (to be discussed later).

The exposure controller 112 performs exposure control on the imaging element 5 (to be discussed later). The exposure controller 112 determines a light measurement value (a luminance value of a subject), in response to the image signal from the imaging element 7 exposure controlled by the exposure controller 111, and performs the exposure control on the imaging element 5 in response to the determined subject luminance value.

The exposure control and other process will be described later.

The system controller 101 performs a focus control process controlling a position of a focusing lens, in cooperation with an auto-focus (AF) module 20, a focus controller 121, etc. In response to the in-focus state of the subject detected by the AF module 20, the system controller 101 performs an AF operation using the focus controller 121. Using light coming in through the focus controller 121, the AF module 20 detects the in-focus state of the subject through an in-focus state detection technique based on a phase difference method.

The focus controller 121 generates a control signal in response to a signal input from the system controller 101, drives a motor M1 with the control signal, and then moves a focusing lens contained in the lens group 37 of the imaging lens unit 3. A lens position detector 39 in the imaging lens unit 3 detects a position of the focusing lens, and sends to the system controller 101 data indicating the position of the focusing lens. The focus controller 121, the system controller 101, and the like control the movement of the focusing lens along the optical axis.

The mirror controller 122 switches between a mirror-up state with a mirror mechanism 6 retracted from the optical path and a mirror-down state with the mirror mechanism 6 blocking the optical path. The mirror controller 122 generates a control signal in response to a signal input from the system controller 101, drives a motor M2 with the control signal, and thus switches between the mirror-up state and the mirror-down state.

The shutter controller 123 generates a control signal from a signal input from the system controller 101, drives a motor M3 with the control signal, and thus controls a shutter 4 for closing or opening state.

The timing controller 124 performs timing control on the imaging element 5 and the like.

The imaging element (for example, a charge-coupled device (CCD)) 5 photoelectrically converts the optical image of the subject into an electrical signal, thereby generating an image signal for a photograph image (a recording image signal). The imaging element 5 is thus an imaging element for capturing a recording image.

The imaging element 5 responds to drive control signals from the timing controller 124 (a storage start signal and a storage end signal), thereby exposing a light receiving surface to the focused image of the subject (accumulating charge resulting from photoelectrical conversion). The imaging element 5 thus generates an image signal responsive to the subject image. In response to a read control signal input from the timing controller 124, the imaging element 5 outputs the image signal to the signal processor 51. A timing signal (synchronization signal) from the timing controller 124 is input to each of the signal processor 51 and an analog-to-digital (A/D) converter 52.

The signal processor 51 performs a predetermined analog signal process on the image signal acquired by the imaging element 5. The A/D converter 52 then converts the analog signal processed, image signal into digital image data. The image data is then supplied to the digital signal processor 50.

The digital signal processor 50 performs a digital signal process on the image data supplied from the A/D converter 52, thereby generating image data for the photograph image. The digital signal processor 50 includes a black-level corrector 53, a white balance (WB) corrector 54, a gamma (γ) corrector 55, and an image memory 56.

The black-level corrector 53 corrects to a reference black level a black level of pixel data forming the image data output from the A/D converter 52. The WB corrector 54 corrects a white balance of the image. The gamma corrector 55 performs a gradation conversion on the photograph image. The image memory 56 temporarily stores the generated image data. The image memory 56 permits a high-speed access, and has a memory capacity storing the image data of several frames.

During photographing, the system controller 101 performs image processes (such as a compression process) on the image data temporarily stored on the image memory 56 and then stores the processed image data on the memory card 90 via the card interface (I/F) 132.

The image data temporarily stored on the image memory 56 is transferred to the VRAM (video RAM) 131 via the system controller 101 and then displayed on the rear monitor 12. In this way, the rear monitor 12 presents an after-view for allowing the user to verify the photograph image. The rear monitor 12 also displays an image reproduced from the past photograph image.

The imaging apparatus 1 further includes the imaging element 7 (see FIG. 4) in addition to the imaging element 5. The imaging element 7 functions as a live-view image capturing (moving image capturing), imaging element. The imaging element 7 is identical in structure to the imaging element 5. It is sufficient if the imaging element 7 has a resolution high enough to generate the live-view image signal (moving image), and the imaging element 7 is typically composed of pixels of a number smaller than the number of pixels in the imaging element 5.

The same signal process as the one performed on the image signal acquired by the imaging element 5 is also performed on the image signal acquired by the imaging element 7. More specifically, the signal processor 51 performs the predetermined signal process on the image signal acquired by the imaging element 7. The resulting signal is then converted into digital data by the A/D converter 52. The digital signal processor 50 then performs the predetermined image process on the digital data from the A/D converter 52. The resulting data is then stored onto the image memory 56.

Time-series image data acquired by the imaging element 7 and then stored on the image memory 56 is successively transferred to the VRAM 131 via the system controller 101. The rear monitor 12 then displays a plurality of images responsive to the time-series image data. The live-view image that looks more like a moving image is thus presented to allow the user to perform the photographic framing.

To speed up each process, the image process by the imaging element 5 and the image process by the imaging element 7 are preferably performed in parallel. To this end, two signal lines are arranged in each of the timing controller 124, the signal processor 51, the A/D converter 52, the digital signal processor 50, etc. The image processes by the imaging elements 5 and 7 are thus performed in parallel. The present invention is not limited to this arrangement. Alternatively, only a single signal line is arranged in each of the timing controller 124, the signal processor 51, the A/D converter 52, the digital signal processor 50, etc., and the process of the imaging element 5 and the process of the imaging element 7 may be performed in that order or in reverse order.

The imaging apparatus 1, including a communication interface 133, can perform data communications with an apparatus (such as a personal computer) connected thereto via the communication interface 133.

The imaging apparatus 1 further includes a flash 41, a photoflash controller 42, and an AF assisting light 43. The flash 41 is a light source that is used when the luminance level of the subject is not high enough. Whether the flash 41 is to be triggered or not, and the flash time thereof are controlled by the photoflash controller 42, the system controller 101, etc. The AF assisting light 43 is an auxiliary light source for auto focusing. Whether the AF assisting light 43 is to be triggered or not and the on time thereof are controlled by the system controller 101, etc.

The photographing process of the imaging apparatus 1 including the photographic framing operation is described below. As described above, the imaging apparatus 1 can perform the photographic framing operation using an optical viewfinder (OVF) including the viewfinder optical system. The imaging apparatus 1 performs the photographing framing operation using the live-view image displayed on the rear monitor 12. The viewfinder function performed using the imaging element 7 and the rear monitor 12 visualizes the image of the subject by converting electronic data, and is thus referred to as an electronic viewfinder (EVF).

By operating a switching dial 87, the user can select between the photographic framing to be performed based on the optical viewfinder (OVF) and the photographing framing to be performed based on the electronic viewfinder (EVF).

Figure 4:
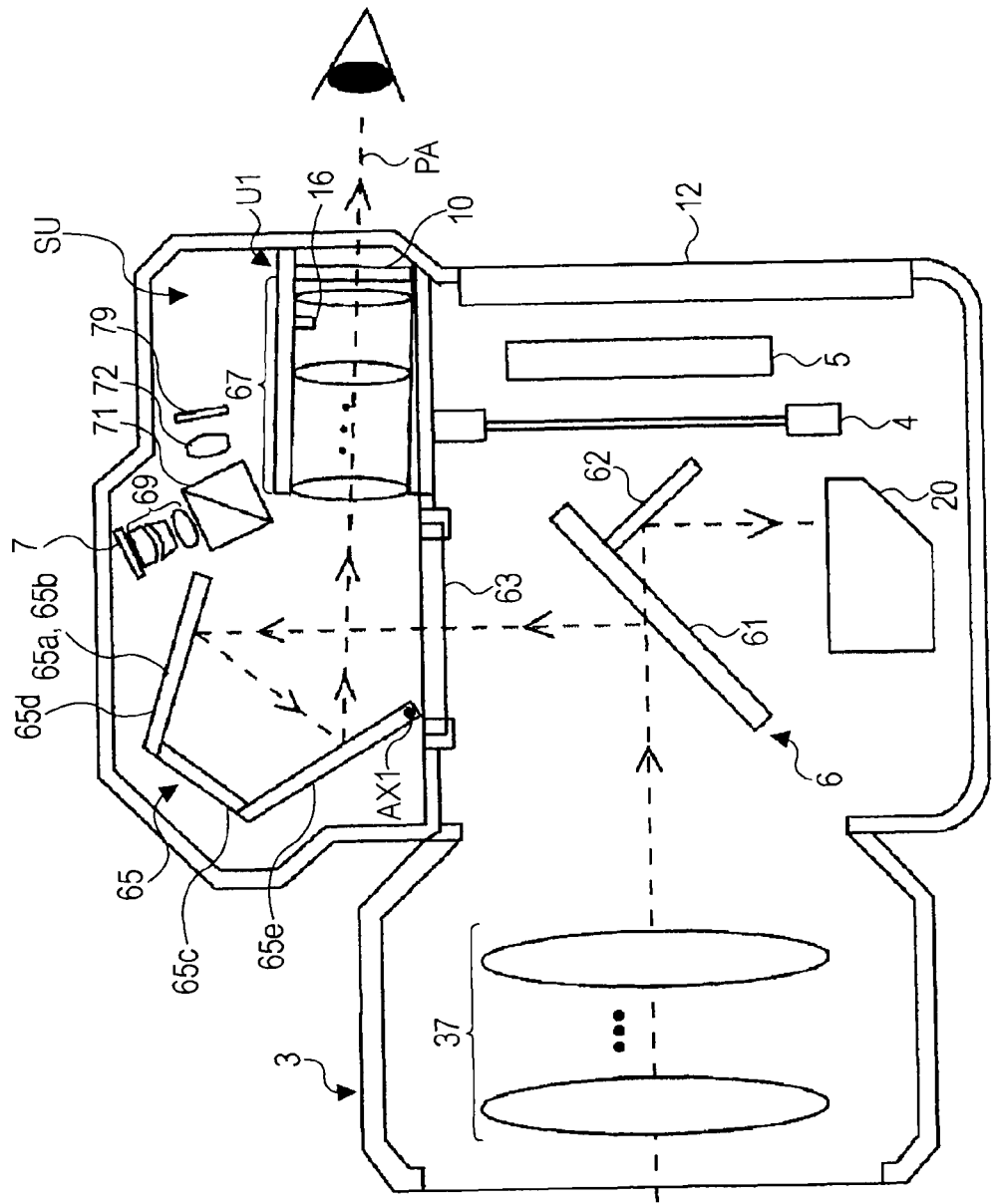
FIG. 4 is a sectional view of the imaging apparatus (in an OVF (optical viewfinder) framing determination operation) according to one embodiment of the present invention.
Figure 5:
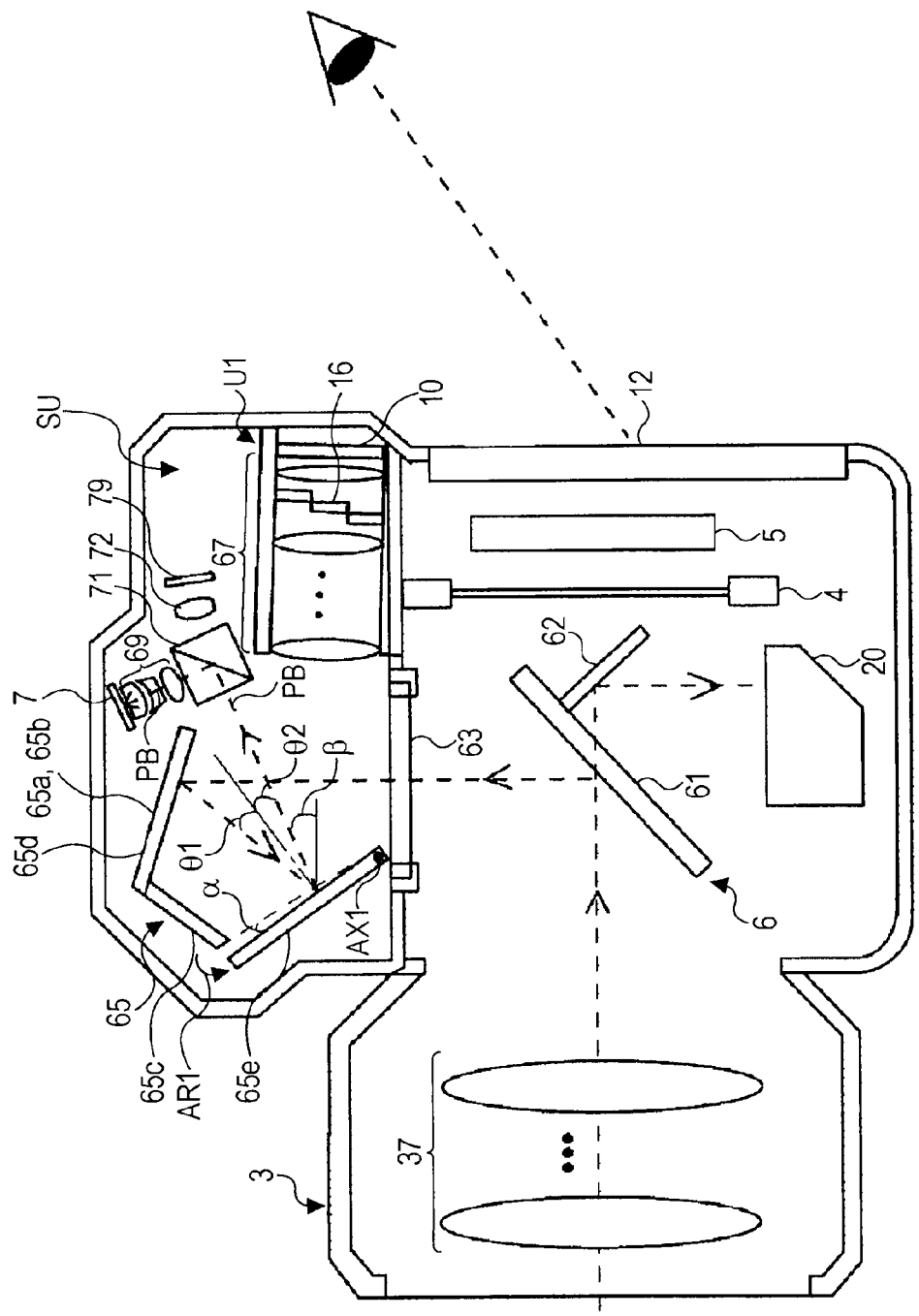
FIG. 5 is a sectional view of the imaging apparatus (in an EVF (electronic viewfinder) framing determination operation) according to one embodiment of the present invention.
Figure 6:
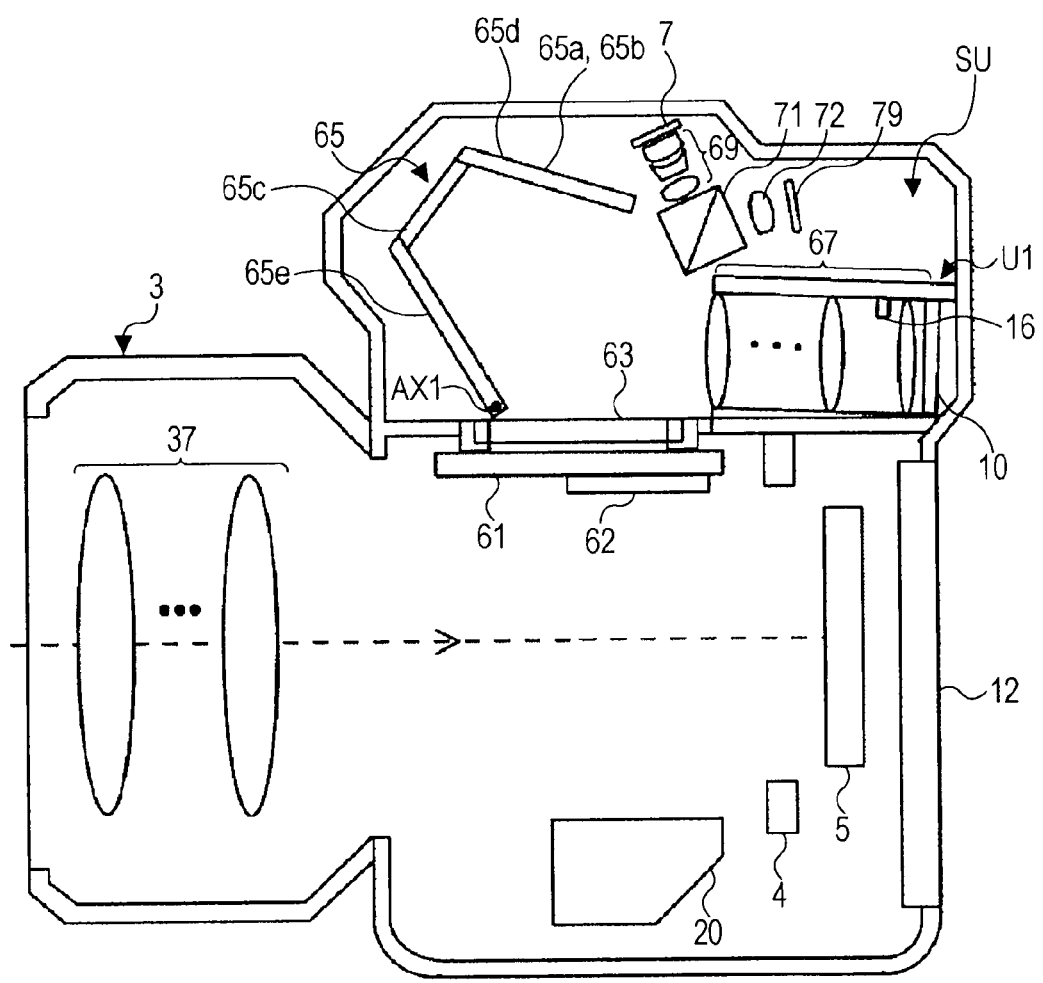
FIG. 6 is a sectional view of the imaging apparatus (in the OVF framing determination operation) according to one embodiment of the present invention.

FIGS. 4 and 5 are sectional views of the imaging apparatus 1. FIG. 4 illustrates the photographic framing operation based on the OVF, and FIG. 5 illustrates the photographic framing operation based on the EVF. FIG. 6 illustrates a state of the imaging apparatus 1 in the an exposure operation (performed during the OVF operation).

As shown in FIG. 4 and other figures, the mirror mechanism 6 is arranged along the photographic optical path extending from the imaging lens unit 3 to the imaging element 5. The mirror mechanism 6 includes a main mirror (main reflective surface) 61 for reflecting upward a light beam from the photographic optical system. Part or whole of the main mirror 61 functions as a half-mirror and causes part of the light beam from the photographic optical system to be transmitted. The mirror mechanism 6 also includes a submirror (sub reflective surface) 62 for reflecting downward the light beam transmitted through the main mirror 61. A light beam reflected off the submirror 62 in the lower portion of the mirror mechanism 6 is guided to and incident on the AF module 20. The light beam incident on the AF module 20 is used in an AF operation of a phase differential method.

The release button 11 is fully pressed to the state S2 during the photographing mode. In other words, the mirror mechanism 6 is arranged to be in a mirror-down position during the photographic framing operation (as shown in FIGS. 4 and 5).

The subject image from the imaging lens unit 3 is reflected upward and then incident on a pentamirror 65 as an observation light beam. The pentamirror 65 includes a plurality of mirror (reflective surfaces), and adjusts a direction of the subject image. The pathway of the observation light beam from the pentamirror 65 becomes different depending on which of the OVF method and the EVF method is used in the photographic framing operation. The pathway of the observation light will be described more later. The user performs the photographing frame according to the selected method.

With the release button 11 fully pressed to the state S2, the mirror mechanism 6 is driven to the mirror-up state, starting the exposure operation (see FIG. 6). A basic operation (i.e., the exposure operation) to acquire a recording still image of the subject (also referred to as a final photograph image) is common to both the OVF and EVF methods.

More specifically, the mirror mechanism 6 is retracted from the photographing optical path as shown in FIG. 6 during the exposure operation. The main mirror 61 and the submirror 62 are retracted upward so that the light beam from the photographing optical system (subject image) is not blocked. The light beam from the imaging lens unit 3 travels without being reflected from the main mirror 61 and reaches the imaging element 5 at a timing of opening of a shutter 4. The imaging element 5 generates an image signal of the subject in response to the received light beam obtained through photoelectric conversion. The light beam from the subject is guided in this way to the imaging element 5 via the imaging lens unit 3. The photograph image of the subject (photograph image data) is thus obtained.

The photographing framing operations based on the OVF and EVF methods are described below.

The photographing framing operation based on the OVF method is described below.

When the main mirror 61 and submirror 62 in the mirror mechanism 6 are arranged along the optical path of the subject image from the imaging lens unit 3 as shown in FIG. 4, the subject image is guided to the viewfinder window 10 via the main mirror 61, the pentamirror 65, and an eyepiece lens 67. The finder optical system, including the main mirror 61, the pentamirror 65, and the eyepiece lens 67, guides the light beam from the photographing optical system, namely, the observation light beam reflected from the main mirror 61, toward the viewfinder window 10.

More in detail, the light beam from the imaging lens unit 3, reflected upward from the main mirror 61, changes the pathway thereof to an upward direction, and is focused on a focusing plate 63, and then passed through the focusing plate 63. The light beam passing through the focusing plate 63 changes the pathway thereof on the pentamirror 65, passes through the eyepiece lens 67, and travels toward the viewfinder window 10 (see optical path PA of FIG. 4). The subject image passing through the viewfinder window 10 reaches the eyes of the user (observer), and is recognized by the user. More specifically, the user can visually recognize the subject image by peering into the viewfinder window 10.

The pentamirror 65 includes two-surface mirrors (roof mirrors) 65a and 65b arranged in a roof position, a surface 65c fixed onto the roof mirrors 65a and 65b, and a mirror (reflective surface) 65e. The roof mirrors 65a and 65b having two surfaces are produced by molding plastic into a unitary component 65d. The light beam reflected upward on the main mirror 61 is then reflected from and right-left mirror reversed on the roof mirrors 65a and 65b, and is reflected from and up-down mirror reversed on the mirror 65e, and then reaches the eyes of the user. The optical image, left-right and up-down mirror reversed by the imaging lens unit 3, is again left-right and up-down mirror reversed by the pentamirror 65. The user can thus observe through the optical viewfinder the image of the subject in the original alignment of the subject.

An optical unit U1 of the viewfinder optical system is arranged within a top enclosure SU of the imaging apparatus 1. The optical unit U1 includes the eyepiece lens 67, the viewfinder window 10, and an eyepiece shutter 16 that is opened and closed by driving means (not shown). During the OVF photographic framing operation, the eyepiece shutter 16 is opened so that the light beam bearing the subject image is transmitted from the pentamirror 65 through the viewfinder window 10.

The light beam, transmitted through the main mirror 61, is reflected downward from the submirror 62 toward the AF module 20. The AF module 20 and the focus controller 121 perform the auto-focus (AF) operation in response to the light beam entering via the main mirror 61 and the submirror 62.

The EVF photographic framing operation is described below.

With reference to FIG. 5, the main mirror 61 and submirror 62 in the imaging element 5 are arranged along the optical path of the light beam bearing the subject image from the imaging lens unit 3. The light beam from the imaging lens unit 3 is reflected upward from the main mirror 61, is focused on the focusing plate 63, and then passes through the focusing plate 63.

In the EVF photographic framing operation, the light beam having passed through the focusing plate 63 is reflected from the pentamirror 65, changing the path thereof toward a beam splitter 71. The beam splitter 71 changes the path of the light beam incident thereon so that the light beam passes through a focusing lens 69 (focusing optical system) to be re-focused on an imaging surface of the imaging element 7 (see an optical path PB of FIG. 5). The light beam reflected upward from the main mirror 61 is reflected from and thus left-right mirror reversed on the roof mirrors 65a and 65b, and then reflected from and thus up-down mirror reversed on the mirror 65e. The light beam is then left-right and up-down mirror reversed on the focusing lens 69, and then reaches the imaging element 7.

More in detail, the angle of the mirror 65e of FIG. 5 with respect to the imaging apparatus 1 in FIG. 5 is different from the angle of the mirror 65e in FIG. 4. More specifically, the mirror 65e is rotated around an axis AX1 at the lower end of the mirror 65e by a predetermined angle α in the direction denoted by an arrow AR1. The mirror 65e rotates in response to an operation of a switching dial 87. More specifically, a rotational driving force applied on the switching dial 87 by the user is transmitted to a rotary shaft of the mirror 65e by a predetermined transmission mechanism (not shown) and then rotates the mirror 65e.

With the mirror 65e changed in the angle thereof, the angle of reflection of the light beam reflected from the mirror 65e (observation light beam) is changed, and the pathway of the light beam reflected from the mirror 65e is changed. More specifically, an incident angle θ1 of the incident light beam to the mirror 65e becomes a relatively smaller angle and a reflection angle θ2 of the light beam reflected from the mirror 65e also becomes a relatively smaller angle. The light beam reflected from the mirror 65e is changed upward from a pathway extending to the eyepiece lens 67 to a pathway close to the roof mirrors 65a and 65b so that the light beam travels to the beam splitter 71. The beam splitter 71 further changes the pathway of the light beam so that the light beam passes through the focusing lens 69 and reaches the imaging element 7. The beam splitter 71, the focusing lens 69, and the imaging element 7 are positioned above the eyepiece lens 67 so that the light beam traveling from the mirror 65e to the eyepiece lens 67 is not blocked during the OVF operation.

The pathway of the light beam reflected from the mirror 65e is changed by an angle of β twice the modified angle α of the mirror 65e. Conversely, to change the angle of the pathway of the light beam by an angle of β, the mirror 65e is simply rotated by an angle of α, half the angle of β. In other words, a relatively small angle of rotation of the mirror 65e causes the pathway of the light beam to change by a relatively large angle. With the mirror 65e and the imaging element 7 optically spaced by a relatively large spacing, a small angle of rotation of the mirror 65e causes the light beam reflected therefrom to be reliably guided to one of the mutually spaced eyepiece lens 67 and imaging element 7. More specifically, the light beam reflected from the mirror 65e is selectively guided to one of the two pathways by rotating the mirror 65e by a small angle of rotation. With this arrangement, an increase in spacing for permitting the mirror 65e to be rotated is minimized.

The imaging element 7 generates a live-view image in response to the light beam bearing the subject image having reflected from the mirror 65e, passed through the focusing lens 69 and reached the imaging element 7. More specifically, a plurality of images are generated at short time intervals (e.g., 1/60 second). Time-series images thus acquired are then successively displayed on the rear monitor 12. The user views a moving image (live-view image) displayed on the rear monitor 12 and then performs the photographic framing using the moving image.

As in the case of the OVF photographic framing operation (FIG. 4), the AF operation is performed using the light beam entering the AF module 20 via the main mirror 61 and the submirror 62.

During the EVF photographic framing, the eyepiece shutter 16 is closed so that light beam input through the viewfinder window 10 is not strayed into an upper enclosure space SU.

As described above, the change in the reflective angle of the pathway (more in detail, main pathway) of the light beam reflected from the mirror 65e switches between the optical path PA (FIG. 4) extending from the mirror 65e to the eyepiece lens 67 and the viewfinder window 10 and the optical path PB (FIG. 5) extending from the mirror 65e to the focusing lens 69 and the imaging element 7. In other words, the pathway of the observation light beam is switched between the first optical path PA reflected from the mirror 65e and extending to the viewfinder window 10 and the second optical path PB reflected from the mirror 65e to the imaging element 7.

An imaging apparatus in the related art typically includes a reflective mirror retractable from an optical path of a light beam bearing a subject image, arranged along an optical path close to the eyepiece lens 67 of a viewfinder optical system. The imaging apparatus 1 provides a live-view display with a compact design free from such an reflective mirror used in the imaging apparatus of the related art.

A light measurement operation performed during the EVF photographic framing operation and a light measurement operation performed during the OVF photographic framing operation are described below.

Figure 7:
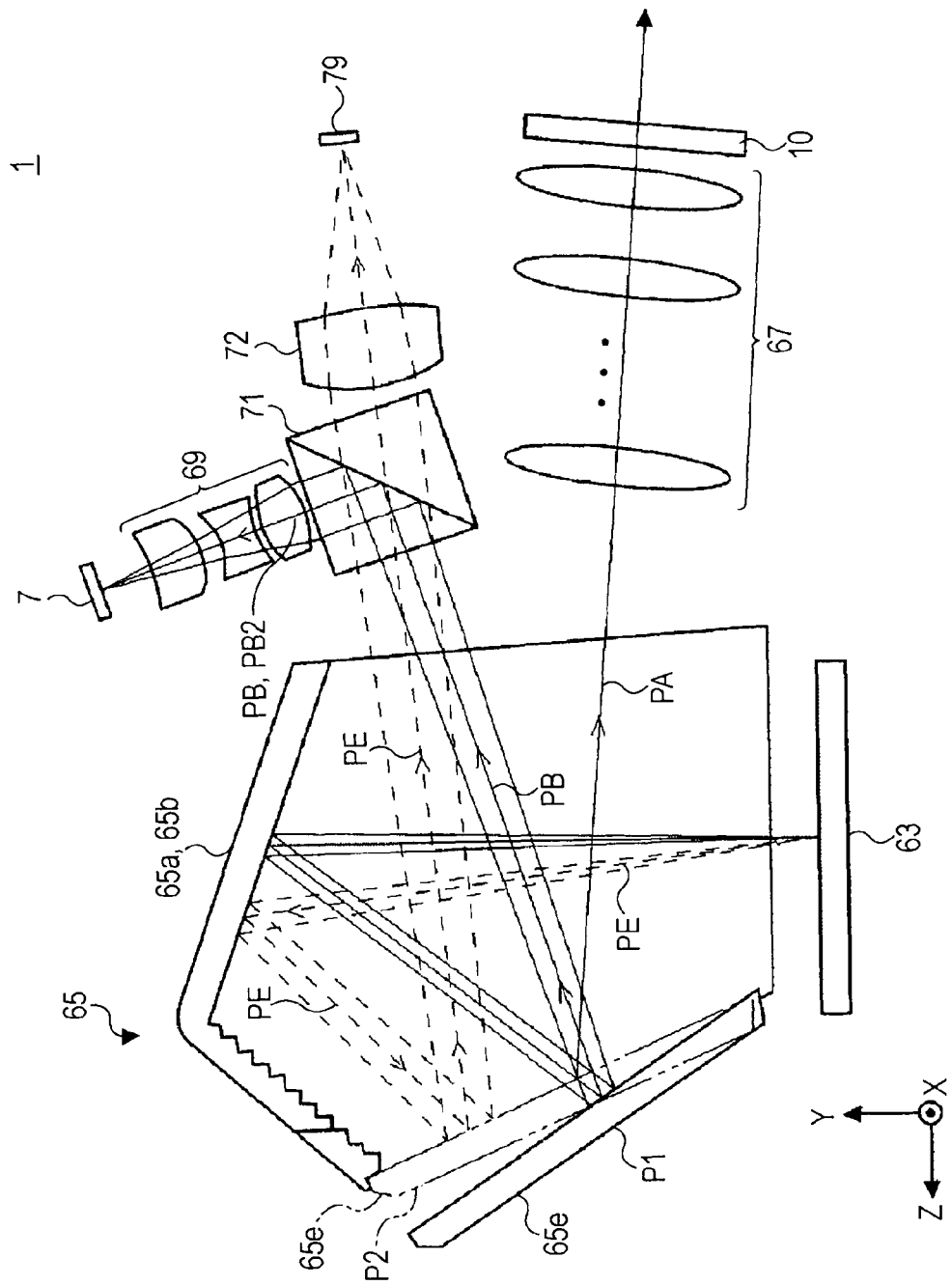
FIG. 7 illustrates an expanded view of a pentamirror and the related parts thereof.

FIG. 7 is an expanded sectional view of an internal structure of the imaging apparatus 1 close to the pentamirror 65. As shown in FIG. 7, the eyepiece lens 67 and the viewfinder window 10 are arranged along the optical path PA. The beam splitter 71, the focusing lens 69, and the imaging element 7 are arranged on the optical path PB.

The beam splitter 71 has an optical path changing function to modify the optical path of the light beam. More specifically, the beam splitter 71, arranged along the optical path PB, bends the optical path of the light beam traveling along the optical path PB (i.e., the light beam reflected from the mirror 65e) upward by about 90 degrees. The focusing lens 69 and the imaging element 7 are arranged along an optical path PB (PB2) that is bent from the optical path PB by the beam splitter 71. The light beam bent by the beam splitter 71 is transmitted through the focusing lens 69 and then focused on the imaging element 7.

During the EVF photographic framing operation, the mirror 65e is placed at a position P1, and the pathway of the observation light beam is the optical path PB. A photograph image is generated based on the subject image focused on the imaging element 7 in response to the light beam having entered along the optical path PB via the beam splitter 71 and the focusing lens 69. A live-view display is generated based on the photograph image, and the light measurement process is also performed based on the same photograph image. For example, the photograph image on the imaging element 7 is partitioned into 40 measurement blocks (8 blocks in a horizontal direction by 5 blocks in a vertical direction). The light measurement process to calculate an amount of light incident on each measurement block is performed. In the light measurement process, a part or all of the plurality of measurement blocks are used. In response to the measurement results, an automatic exposure adjustment process is then performed. The automatic exposure adjustment determines photograph parameters (aperture value, shutter speed, etc.) to obtain appropriate illuminance.

During the OVF photographic framing operation, the mirror 65e is placed at a position P2 (represented by a two-dot-and-dash chain line in FIG. 7), causing the optical path PA to be the pathway of the observation light beam. The user views the subject image through the viewfinder window 10 and the light measurement is performed using a light sensing detector (light sensing element) 79 arranged in the vicinity of the optical path PA in the space SU. The light sensing detector 79 receives on a focusing lens 72 the light beam transmitted through the beam splitter 71 arranged near the optical path PA to perform the light measurement process.

The light sensing detector 79, optically in alignment with the focusing plate 63, receives a light beam having traveled along an optical path PE represented by broken lines in FIG. 7, namely, a light beam having traveled side by side with the optical path PA and passed through the beam splitter 71. The beam splitter 71 is placed at a position where the optical path PB and the optical path PE meet. The light beam traveling along the optical path PE passes through the beam splitter 71 and then reaches the light sensing detector 79. The light sensing detector 79 receives the light beam having traveled along the optical path PE. The light sensing detector 79 thus receives the observation light beam bearing the subject image having traveled along the optical path PA (in other words, the optical image identical to the subject image to be photographed). More specifically, the light sensing detector 79 receives an optical image of the subject at a slant angle slightly different from an angle at which the subject is viewed through the viewfinder window 10.

The light measurement process is performed on an amount of light at the light sensing detector 79. For example, the light measurement process is performed by calculating the amount of light on each of a plurality of measurement blocks (for example, 40 blocks) in the light sensing detector 79. In response to the measurement results, an automatic exposure adjustment process is performed. The automatic exposure adjustment process determines photograph parameters (aperture value, shutter speed, etc.) to obtain appropriate illuminance.

The pathway of the observation light beam is the optical path PA during the OVF photographic framing operation, and no appropriate subject image is focused on the imaging element 7. Without the light sensing detector 79, it becomes difficult to perform the appropriate light measurement process during the OVF photographic framing operation.

The imaging apparatus 1 performs the photographing operation as described above.

The imaging apparatus 1 performs the light measurement operation and the exposure control operation using the image signal (exposure image) of the imaging element 7 during the EVF mode, and performs the light measurement operation and the exposure control operation using the light sensing detector 79 during the OVF mode.

The light measurement operation in the EVF mode, namely, the light measurement operation using the imaging element 7 is described below.

For convenience of explanation, the light sensing detector 79 is described first before discussing the imaging element 7.

Figure 8:
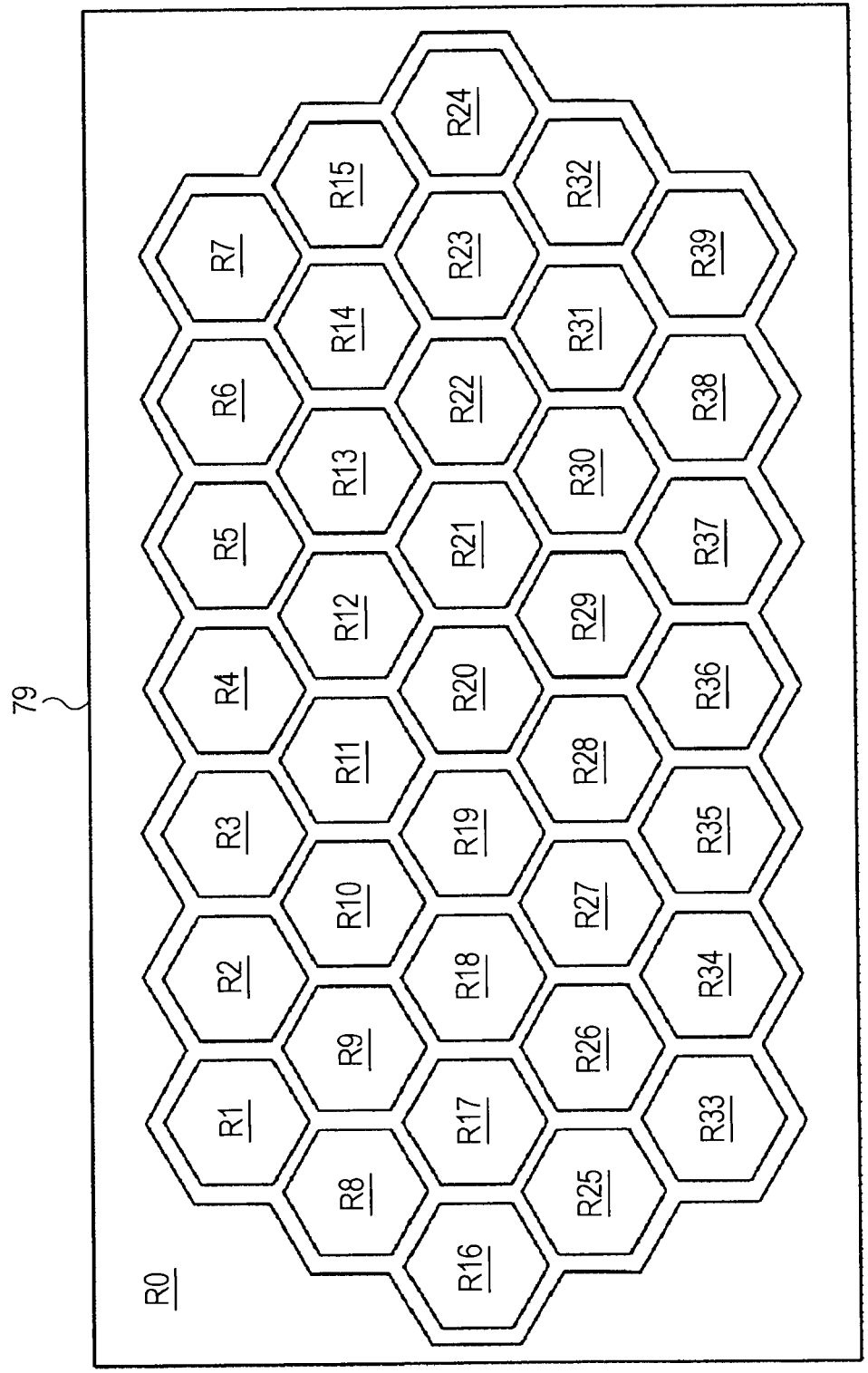
FIG. 8 is a plan view of a light receiving surface of a light sensing detector viewed from a light incident side.

The light sensing detector 79 includes a high-accuracy device such as silicon photo cells (SPCs). More specifically, the light sensing detector 79 includes a plurality of silicon photo cells as shown in FIG. 8. The light sensing detector 79 outputs a voltage responsive to a illuminance level of input light, and the system controller 101 converts the output voltage value of the light sensing detector 79, into a VB value indicating an absolute luminance value, in accordance with a conversion equation.

FIG. 8 is a plan view of a light receiving surface of a light receiving unit of the light sensing detector 79, viewed from the input side of the light sensing detector 79. As shown in FIG. 8, the light sensing detector 79 is partitioned into a plurality of areas (40 areas) of R0-R39. The illuminance (luminance) of the optical image received by the receiving unit is measured on each silicon photo cell at each of the 40 areas. In the light measurement operation, at least one area may be used. For example, the light sensing detector 79 may acquire the mean value of measured illuminance values at all the 40 areas as the light measurement value.

The input-output characteristics of the light sensing detector 79 have an extremely wide measurement range of from an extremely low luminance range (for example, BV value=−9) to an extremely high luminance range (for example, BV value=17).

The imaging element 7 has a narrow measurement range in comparison with the light sensing detector 79. However, an exposure amount can be controlled by modifying the shutter speed, the aperture value, etc. in response to the illuminance of input light in order to widen a measurement range to some degree. The light measurement operation may be performed with a relatively wide measurement range. More specifically, feedback control to set a pixel value L of an exposure image of the imaging element 7 to be close to a target pixel value Lt is performed to maintain an appropriate exposure light amount to the imaging element 7. Under a relatively bright environment, the exposure light amount is reduced by achieving a high-speed shutter speed in the imaging element 7 (i.e., by shortening a shutter open time). Conversely, under a relatively dark environment, the exposure light amount is increased by achieving a low-speed shutter speed in the imaging element 7 (e.g., by lengthening the shutter open time).

The measurement results of the imaging element 7 (luminance) bv are calculated based on a pixel value L of the imaging element 7 (for example, the mean pixel value within a predetermined area) in accordance with equation (1) in principle by the system controller 101:

$$bv(n)=Tv(n)+Av(n)-Sv(n)+\log_2(L(n)/Lt) \quad (1)$$

where a value Tv represents a TV value related to an open time (exposure time) of an electronic shutter of the imaging element 7, a value Av represents an AV value related to the aperture of the photographing optical system, and a value Sv represents a SV value related to a photographing gain of the imaging element 7. Furthermore, a value Lt represents a target value (fixed value) of a pixel value L (more specifically, the mean value of pixel values of pixels contained in the predetermined area of the exposure image) of the exposure image of the imaging element 7, and (n) attached to each term represents a value at an n-th sampling time after a predetermined point of time.

More specifically, exposure parameters (e.g., the values Tv, Av and Sv) are determined so that the pixel value L of the imaging element 7 reaches the target value (target pixel value) Lt. If the pixel value L takes any value falling within a range of from 0 to 4095, the feedback control is performed to determine the values Tv, Av, and Sv that cause the value L to equal the target value Lt (for example, 493). Ideally, the fourth term on the right side of equation (1) becomes zero and the luminance value bv is calculated from the first to third terms of the right side of equation (1).

The values Tv, Av, and Sv are determined in the feedback control so that the value L approaches the target value Lt, i.e., so that a difference between the value L and the target value Lt approaches zero. More in detail, the value Tv is updated every sampling time Δt in accordance with equation (2). A value Tv(n+1) (the value Tv at a given time t(n+1)) is corrected to a value represented by equation (2) using a value Tv(n) (a value Tv at time t(n) a short time length Δt before):

$$Tv(n+1)=Tv(n)+k \log_2(L(n)/Lt) \quad (2)$$

where a value k satisfies a range of 0<k<1.

The larger (the closer to 1) the value k, the more likely, the feedback system suffers from hunting phenomena. The smaller (the closer to zero) the value k, the longer time the pixel value L takes to converge from to the target value. The value k may be fixed or variable. More in detail, the value k may be varied depending on the magnitude of the value ΔL (difference between the value L and the target value Lt). For example, the value k may be set to be a relatively large value (for example, 0.95) if the value ΔL is relatively large. Conversely, the value k may be set to a relatively small value (for example, 0.5) if the value ΔL is relatively small. With this setting, the hunting phenomenon is controlled while a settling time to a stable state is shortened.

If the pixel value L approaches the target value Lt and the value ΔL (more strictly, the absolute value of the value ΔL) becomes smaller than a permission value TH (ideally becomes zero) in the course of the feedback control, the exposure control is determined as settled to a stable state. A live-view image at the stable state is acquired as an image having appropriate illuminance. As a result, a live-view image having appropriate illuminance is displayed on the rear monitor 12.

The values Tv, Av, and Sv have respective limit values thereof to variation ranges thereof. With the illuminance level out of a predetermined range, it is difficult to cause the value L to approach the target value Lt even if the values Tv, Av, and Sv are controlled. In such a case, a modified value with the fourth term on the right side of equation (1) added is calculated as a luminance value bv. For example, if the optical image is darker than a predetermined level, the presence of the limit values of the variation ranges of the values Tv, Av, and Sv makes it difficult to cause the value L to approach the target value Lt. For example, if the value L is half the target value Lt, the fourth term on the right side of equation (1) becomes −1. By adding −1 to the sum of the first term to the third term on the right side of equation (1) (in other words, by subtracting 1 from the sum of the first term to the third term on the right side of equation (1)), the luminance value bv is calculated. In a settling determination process to the stable state, the stable state is determined as being reached if a change in the magnitude of the value ΔL is smaller than a predetermined width (in other words, the value L or the value ΔL is substantially constant) even if the value ΔL remains larger than the permission value TH.

The luminance value bv in the stable state is considered a subject luminance in the exposure control of the final photograph image. The exposure control is performed on the final photograph image based on the subject luminance bv. More specifically, appropriate values are set for TvB, AvB, SvB when a subject having a luminance value bv is photographed (refer equation (3)). The value TvB is a TV value related to the shutter speed of the imaging element 5, the value SvB is a SV value related to the photographing gain of the imaging element 5, and the value AvB is an AV value related to the aperture of the photographing optical system during a final photographing operation using the imaging element 5.

$$TvB+AvB-SvB=bv \quad (3)$$

In the above described feedback control system for the above-described light measurement (referred to as light measurement feedback control system), a long time is needed before reaching the "stable state," for example, several times the sampling time Δt through tens of the sample times Δt (or longer depending on conditions) may be needed.

Figure 9:
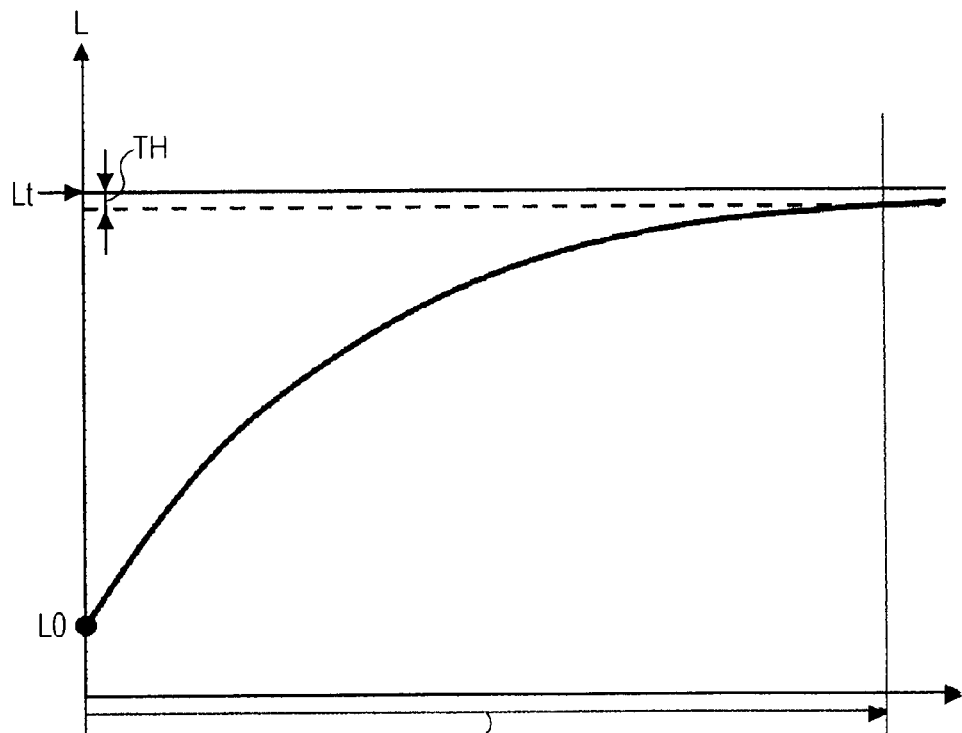
FIG. 9 illustrates a variation curve of a value L (with L0 far from Lt)

If a value L0 is far apart from the target value Lt at a given time as shown in FIG. 9, a relatively long time T11 as a settling time TA to reach the stable state is needed.

If the value L of the imaging element 7 is far apart from the target value Lt at power on, a unit operation per sampling time Δt is repeated by a number of times before reaching the stable state. A relatively long time is thus needed to reach the stable state.

The settling time TA to the stable state is preferably shorter.

Figure 10:
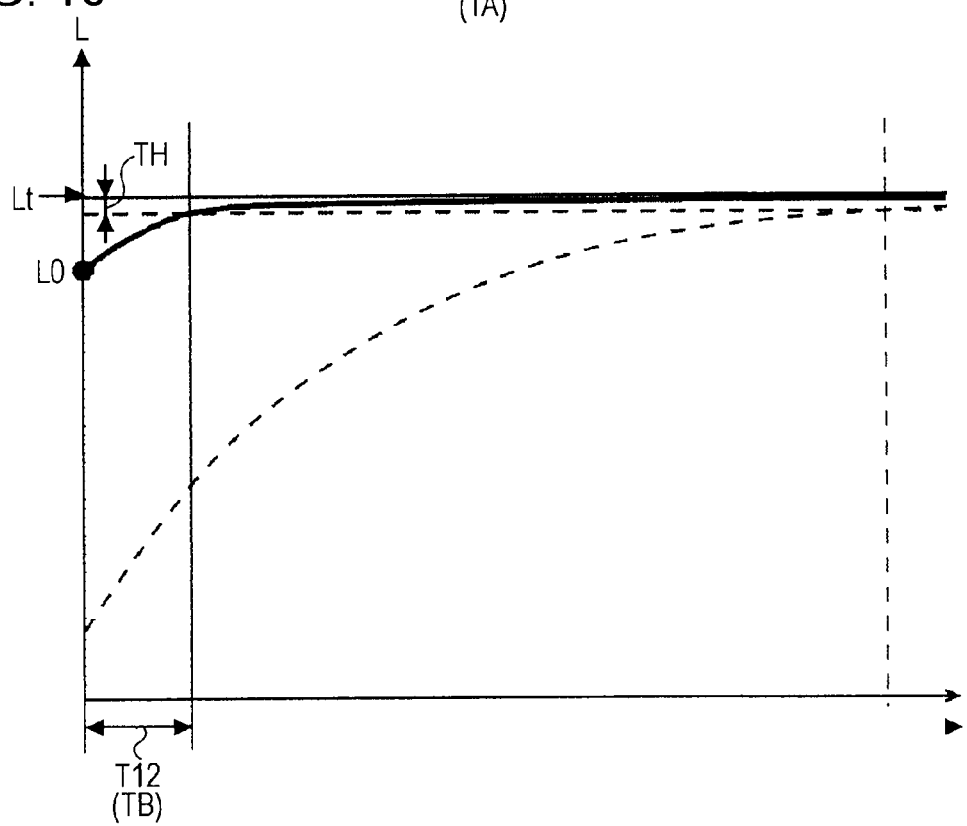
FIG. 10 illustrates a variation curve of the value L (with L0 near Lt)

The inventors of this invention have found that a more appropriate initial control value is obtained at the start time of the exposure control (light measurement feedback control) using the light sensing detector 79. Since the exposure control starts at an initial control value L0 relatively closer to the target value Lt as shown in FIG. 10 in accordance with the founding, the settling time TA to the stable state is set to be a relatively short time T12 (<T11).

More specifically, the illuminance (luminance) surrounding the imaging element 7 is measured by the light sensing detector 79, and the exposure control value at the start time of the exposure control is determined based on the measured illuminance (measured luminance). In the light measurement feedback control using the imaging element 7, the appropriate initial pixel value L0 is determined by determining appropriate initial values (Tv(0), Sv(0), Av(0)). The settling time TA to the stable state is thus shortened.

As the measurement value related to illuminance surrounding the imaging element 7 (luminance), measured luminance (measurement value) bv of the light sensing detector 79 is directly used to determine the exposure control value (also referred to as an exposure control parameter or an exposure parameter). For example, the exposure parameters Tv, Av, and Sv satisfying equation (4) may be determined with respect to the measured luminance bv:

$$Tv+Av-Sv=bv \qquad (4)$$

The light measurement value of the light sensing detector 79 is not strictly a measurement value of the subject image but a measurement value obtained from the ambient illuminance surrounding the imaging element 7 receiving the subject image. The light measurement value of the light sensing detector 79 contains an error.

The imaging apparatus 1 corrects the measurement value of the light sensing detector 79 using a correction term E (see equation (5)) related to the measured luminance of the light sensing detector 79. More in detail, an estimated luminance (bv+E) of the imaging element 7 is calculated using the correction term E. The exposure control value (exposure parameter) in the exposure control is determined based on the estimated luminance (i.e., corrected measurement value), and then the exposure control is started. The subject luminance of the imaging element 7 is more accurately estimated, allowing the initial value of the value L to approach further the target value Lt. The more appropriate initial value is used in the light measurement feedback control using the imaging element 7, and the settling time TA to the stable state is thus further shortened:

$$Tv+Av-Sv=bv+E \qquad (5)$$

where the term E corrects a difference (deviation) between the measurement value of the light sensing detector 79 and the intrinsic illuminance (luminance) of the subject. The correction term E is predetermined based on test results or the like.

Figure 11:
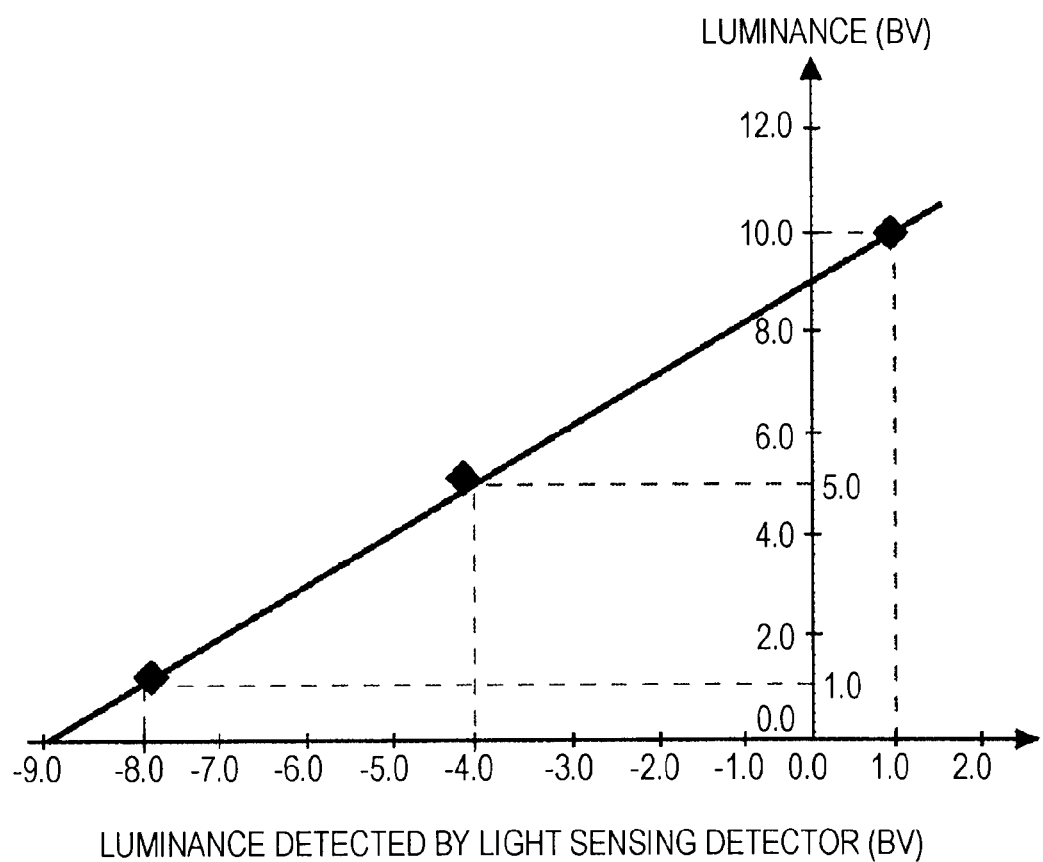
FIG. 11 is a plot of a relationship between a light measurement value of the light sensing detector and a illuminance of a subject.

FIG. 11 illustrates a relationship between the light measurement value of the light sensing detector 79 (in the abscissa) and the actual illuminance (luminance) of the subject (in the ordinate). In test results of FIG. 11, the light measurement value bv with the stable state reached in the light measurement feedback control of the imaging element 7 is obtained as the actual illuminance (actual luminance).

As shown in FIG. 11, the illuminance of the subject (actual luminance) is about 10 when the measurement value (detected luminance) of the light sensing detector 79 is about 1, and the illuminance of the subject (actual luminance) is about 1 when the measurement value (detected luminance) of the light sensing detector 79 is about −8. More specifically, the intrinsic illuminance of the subject is brighter by about 9 (EV) than the measurement result of the light sensing detector 79. In this case, the correction term is obtained as 9 (EV).

A fixed value "9" is used as the value of the correction term E on the premise that the subject luminance and the measurement value of the light sensing detector 79 have a linear relationship within the entire light measurement range. The present invention is not limited to the fixed value of the correction term E. The correction term E may not be a fixed value. For example, the correction term E may be determined as a function, the function having as a variable the light measurement value bv of the light sensing detector 79.

The light measurement operation is further described in detail.

Figure 12:
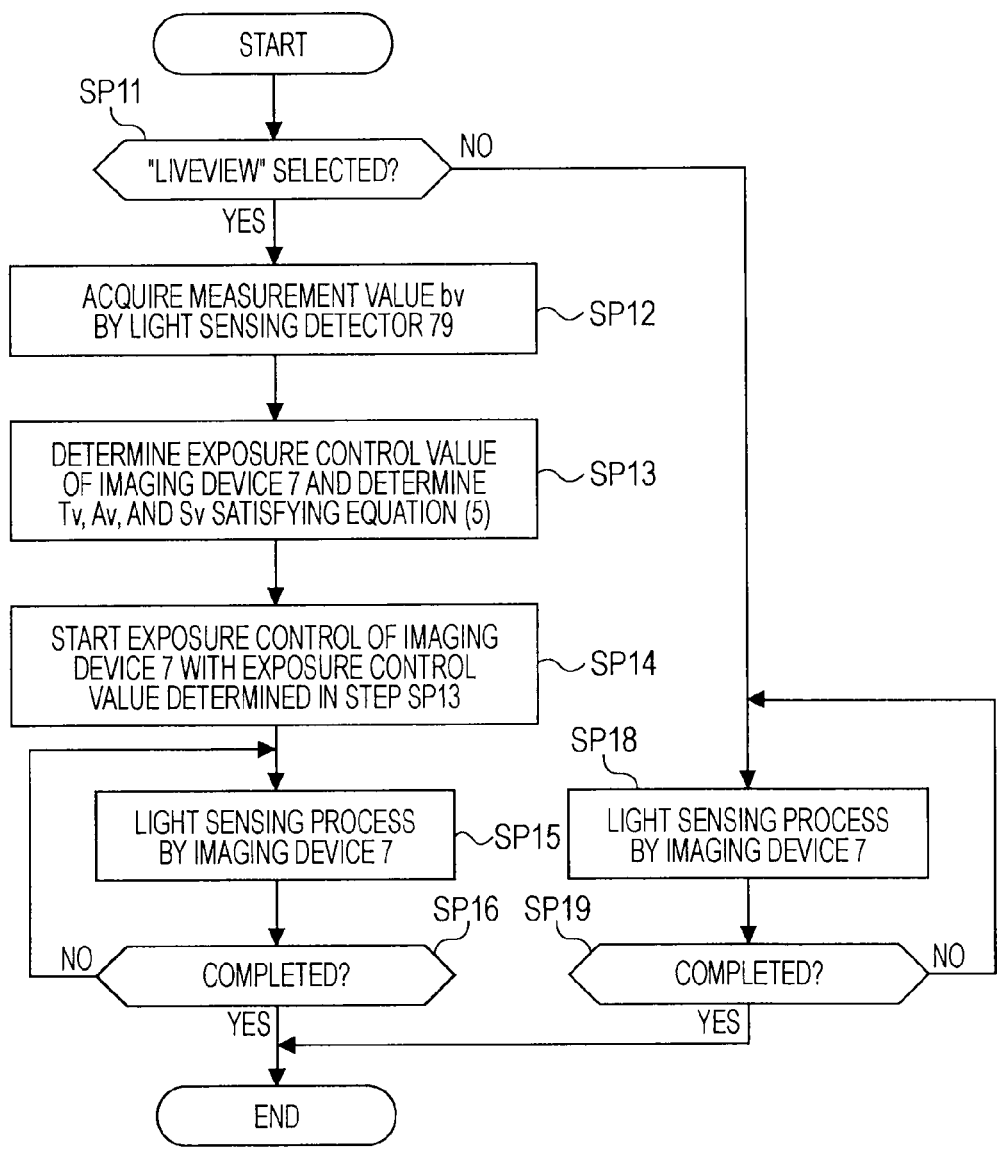
FIG. 12 is a flowchart illustrating operation of the imaging apparatus.

FIG. 12 is a flowchart illustrating a light measurement operation and the like performed immediately subsequent to a power-on state of the imaging apparatus 1. The imaging apparatus 1 performs the process of FIG. 12 subsequent to shifting to the power-on state.

In step SP11, the imaging apparatus 1 determines whether the EVF mode is selected or not, i.e., whether a live-view is selected. If the OVF mode is selected, processing proceeds to step SP18. In step SP18, the light measurement process in the OVF mode is performed using the light sensing detector 79. If it is determined in step SP19 that the release button 11 is pressed to the fully-pressed state S2, a final photograph image is acquired, and then the series of steps are completed.

If it is determined in step SP11 that the EVF mode is selected, processing proceeds to step SP12. The imaging apparatus 1 recognizes that a particular condition is satisfied, more in detail, that a timing to start the exposure control has come in response to the shifting to the power-on state. In steps SP12-SP14, the light sensing detector 79 in the imaging apparatus 1 determines the exposure control value, and starts the exposure control of the imaging element 7 based on the exposure control value.

In step SP12, the light sensing detector 79 starts the light measurement operation. More specifically, the light sensing detector 79 acquires the light measurement value bv.

In step SP13, the exposure parameters Tv, Av, and Sv related to the imaging element 7 are determined in accordance with equation (5). Equation (5) shows that the corrected illuminance (bv+E) is expressed as the sum of the correction term E and the light measurement value bv of the light sensing detector 79. Equation (5) is also considered similar to equation (4) that describes the relationship between the exposure parameters and the measured luminance.

In step SP14, the exposure control of the imaging element 7 is started using the exposure parameter determined in step SP13.

The imaging element 7 acquires an image (exposure image) with the exposure parameters Tv, Av, and Sv determined using the light measurement value bv of the light sensing detector 79.

In step SP15, the unit process in the light exposure loop of the light measurement feedback control is repeated.

The light measurement feedback control performed herein updates the value Tv out of the exposure parameters Tv, Av, and Sv at any time. More specifically, relationships Av(n+1)=Av(n) and Sv(n+1)=Sv(n) hold in many cases. The value Tv(n+1) is determined as described below.

Figure 13:
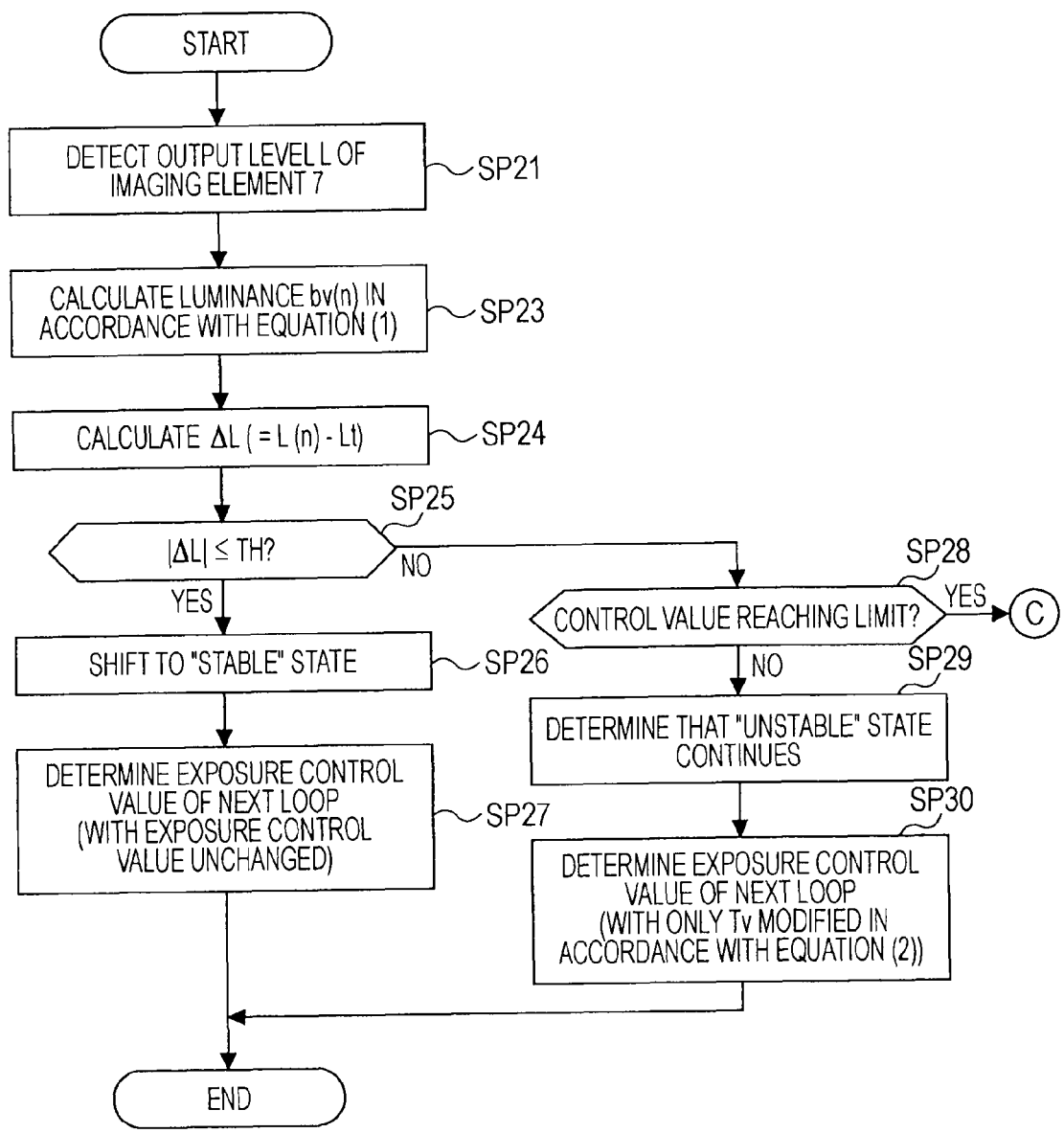
FIG. 13 is a flowchart illustrating in detail a light measurement process (step SP15)
Figure 14:
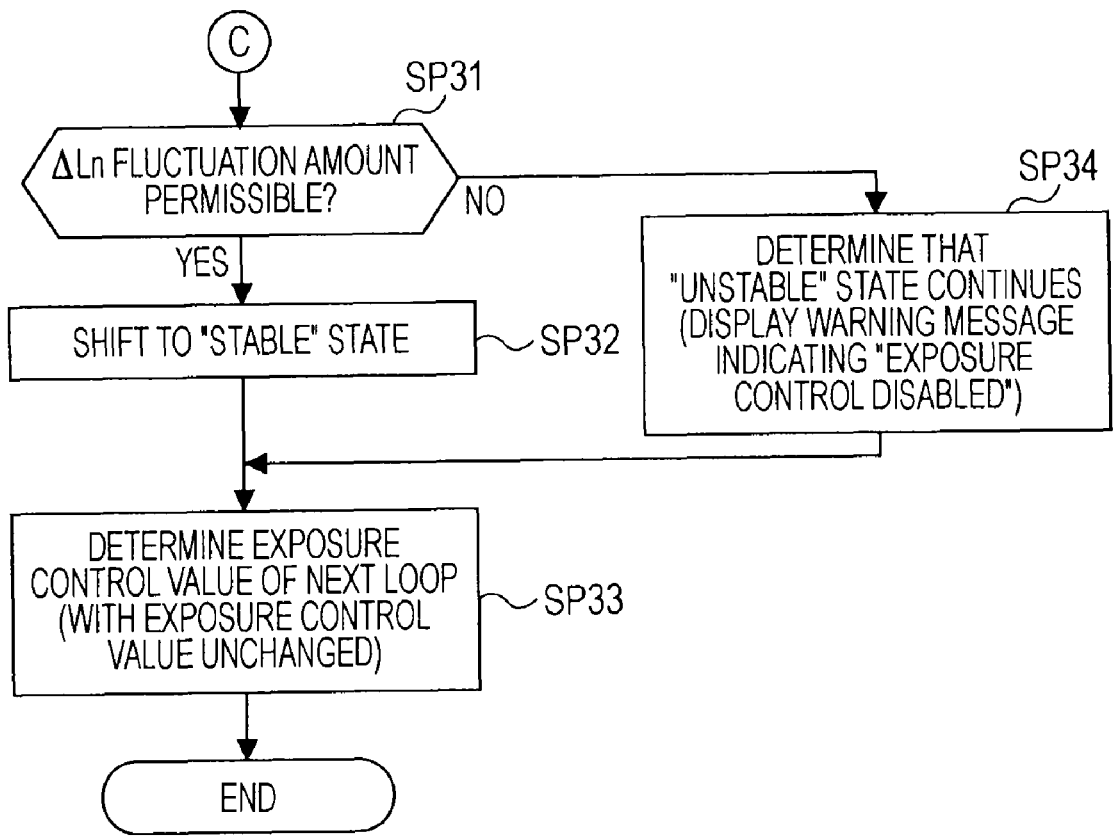
FIG. 14 is a flowchart illustrating in detail the light measurement process (step SP15)

FIGS. 13 and 14 are flowcharts illustrating in detail the unit process in step SP15. The unit process is performed within an extremely short time (e.g., at about ⅒ second intervals) in the photographic framing operation in the EVF mode.

In step SP21, the pixel value L of the imaging element 7 (e.g., the mean pixel value in a predetermined area) is detected.

In step SP23, the light measurement value bv(n) is calculated using equation (1).

The value ΔL is calculated (step SP24) and a comparison process comparing the value ΔL with the permission value TH is performed (step SP25).

If the value ΔL (precisely, the absolute value |ΔL| of the value ΔL) is equal to or smaller than the permission value TH, it is determined that the stable state has been reached (step SP26). In a next (n+1)-th loop, the exposure parameter is set to be the same value as the exposure parameter in the current n-th loop (step SP27). The process in the n-th loop thus ends.

If the value ΔL (precisely, the absolute value |ΔL| of the value ΔL) is greater than the permission value TH, the imaging apparatus 1 determines in step SP28 whether the exposure parameter (for example, the value Tv) has reached the limit value of the variation range thereof.

If it is determined in step SP28 that the exposure parameter has not reached the limit value of the variation range thereof (for example, the value Tv can be further decreased or can be further increased), processing proceeds to step SP29. In step SP29, the imaging apparatus 1 determines that an unstable state still continues. In step SP30, the imaging apparatus 1 determines the exposure parameter Tv(n+1) in the (n+1)-th loop in accordance with equation (2). The n-th loop process thus ends.

If the imaging apparatus 1 determines in step SP28 that controlling the values Tv, Av, and Sv to cause the value L to follow the target value Lt is difficult, processing proceeds to step SP31 (FIG. 14).

If a change in the magnitude of the value ΔL is smaller than a predetermined width TH2 (i.e., one the value L and the value ΔL remains substantially constant), the imaging apparatus 1 determines that the stable state has been reached (step SP32). The exposure parameter in the next (n+1)-th loop is set to be the same value as the exposure parameter in the current n-th loop (step SP33). The n-th loop process thus ends.

If a change in the magnitude of the value ΔL equal to or greater than the predetermined width TH2, the imaging apparatus 1 determines that an unstable state still continues and presents a warning display indicating that exposure control is disabled (step SP34). The imaging apparatus 1 performs step SP33, and the n-th loop ends.

When the n-th loop ends, an exposure operation of the imaging element 7 using a new exposure control value (exposure parameter) is executed. The process in step SP15 ((n+1)-th loop process) is then performed on an exposure image obtained in the exposure operation.

Returning to FIG. 12, with SP15 repeated, the imaging apparatus 1 determines in step SP16 that the release button 11 has been fully pressed to the state S2. The final photograph image is then acquired, and the series of steps have been completed. When the final photograph image is captured, an appropriate exposure parameter is determined in accordance with equation (3).

According to embodiments of the present invention, the start timing of the exposure control is reached when the imaging apparatus 1 is switched. The exposure control is performed based on the light measurement value of the light sensing detector 79 rather than the light measurement value of the imaging element 7 (steps SP12-SP15). The mean pixel value L of exposure pixels (i.e., an initial pixel value L0 in the exposure control) acquired first by the imaging element 7 in step SP14 becomes relatively close to the target value Lt (see FIG. 10). The time to arrive (TA) at the stable state becomes the relatively short time T12 (<T11).

In step SP13, the exposure parameters Tv, Av, and Sv of the imaging element 7 are determined based on the light measurement value (bv+E) as a result of correction using the correction term E. The initial pixel value L0 in the exposure control is close to the target value Lt. The time to arrive at the stable state TA is thus shortened.

According to the first embodiment, the exposure parameter is determined based on the light measurement values of the light sensing detector 79 when the exposure control is started, i.e., when the exposure control including the light measurement feedback control is started in response to the shifting to the power-on state of the imaging apparatus 1.

A different situation may be considered when the value L related to the imaging element 7 is largely off the target value Lt (see FIG. 9). For example, when the luminance of the subject sharply changes, the sampling time Δt of the unit operation is repeated by a large number of times until the stable state is reached. A relatively long time is taken before the imaging apparatus 1 reaches the stable state.

The technique of the present invention may be used in such a situation. More specifically, the light measurement value of the light sensing detector 79 may also be used at a timing other than the "start timing of the exposure control."

In a second embodiment, the exposure control is performed based on the light measurement value of the light sensing detector 79 even after the timing the imaging apparatus 1 determines that the value L of the imaging element 7 is far off the target value Lt. The following discussion of the second embodiment focuses on the difference thereof from the first embodiment.

Figure 15:
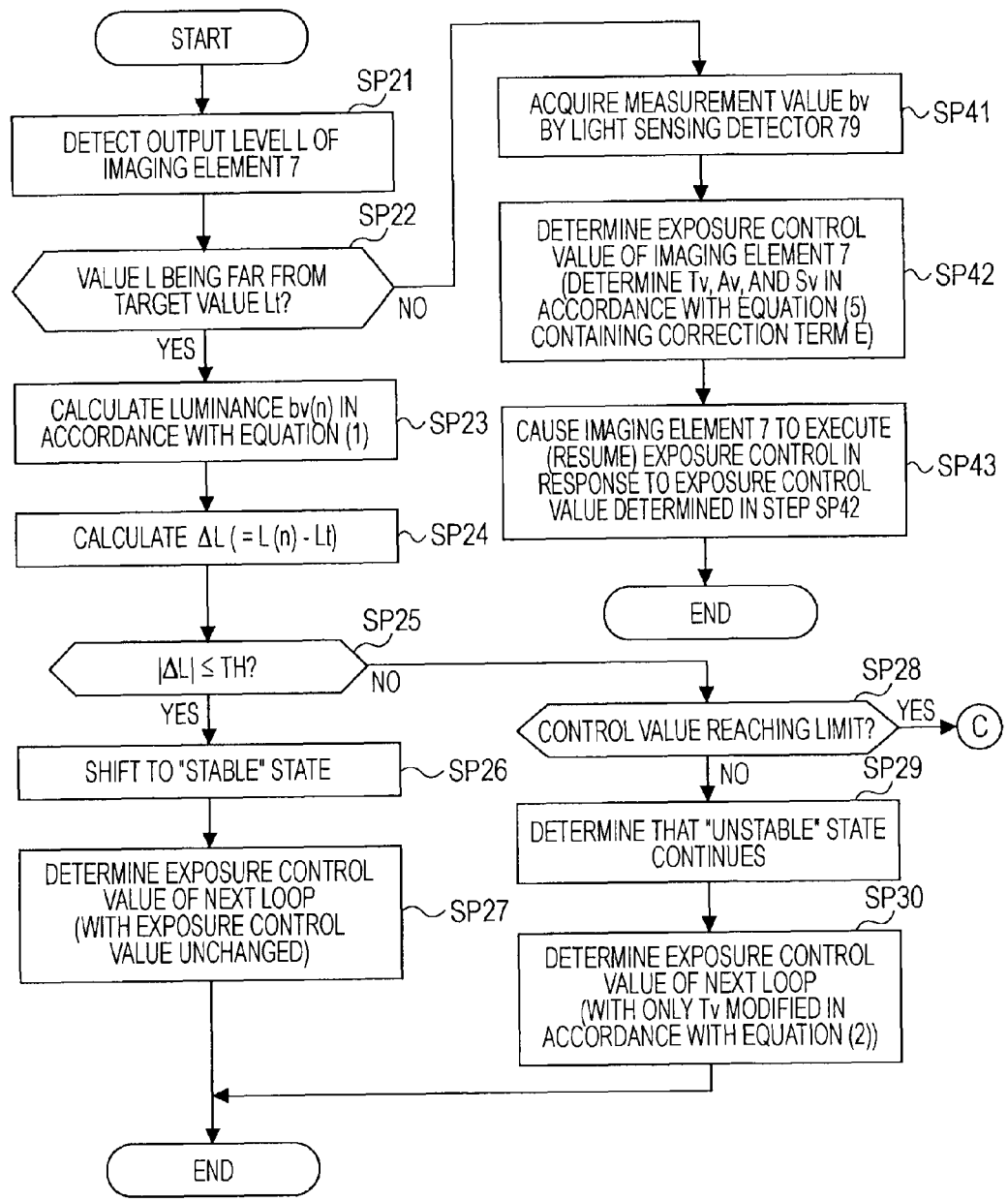
FIG. 15 is a flowchart illustrating a light measurement process according to a second embodiment of the present invention.

FIG. 15 is a flowchart illustrating the unit operation in the light measurement process of the EVF mode of the imaging apparatus 1 according to the second embodiment of the present invention. According to the second embodiment, a process of FIG. 15 is performed instead of the process of FIG. 13.

More specifically, step SP22 is performed between steps SP21 and SP23.

In step SP22, the imaging apparatus 1 determines whether the value L at a given moment is far off the target value Lt. More specifically, the imaging apparatus 1 determines whether a deviation between the value L and the target value Lt is greater than a threshold value TH3. The threshold value TH3 is greater than each of the permission values TH and TH2 (TH3>TH and TH3>TH2).

If it is determined that the value L is relatively closer to the target value Lt, namely, |L−Lt|<TH3, processing proceeds to step SP23. In step SP23 and subsequent steps, the light measurement feedback process is performed using the light measurement value of the imaging element 7. The threshold value TH3 is used to determine whether the value L is far off the target value Lt, and set to be a relatively large value.

If it is determined that the value L is far off the target value Lt, namely, |L−Lt|>TH3, processing proceeds to step SP41. If the luminance of the subject sharply changes, the value L falls far outside the target value Lt and thus processing proceeds to step SP41.

In step SP41, the light sensing detector 79 measures the light measurement value bv. In step SP42, the imaging apparatus 1 determines the exposure parameters Tv, Av, and Sv according to the light measurement value bv of the light sensing detector 79 and the correction term E of equation (5). In step SP43, the exposure control is started (resumes) in response to the exposure parameters determined in step SP42.

In the above operation, the imaging apparatus 1 resumes the exposure operation on the imaging element 7 using the light measurement value of the light sensing detector 79 even when the luminance of the subject changes sharply at any moment. The time to arrive, TA, at the stable state from the resuming time point is thus shortened.

The above operation is interpreted as being an operation of determining the exposure control value (exposure parameter) based on the light measurement value of the light sensing detector 79 if the imaging apparatus 1 determines that the pixel value L of the exposure pixel of the imaging element 7 is outside the range of from a value (Lt−TH3) to a value (Lt+TH3).

According to the second embodiment, the exposure control value is determined based on the light measurement value of the light sensing detector 79 after the moment it is determined that the value L of the imaging element 7 is far off the target value Lt. Alternatively, whether to determine the exposure control value based on the light measurement value of the light sensing detector 79 is determined depending on whether the value L of the imaging element 7 is outside a range RG described below.

Figure 16:
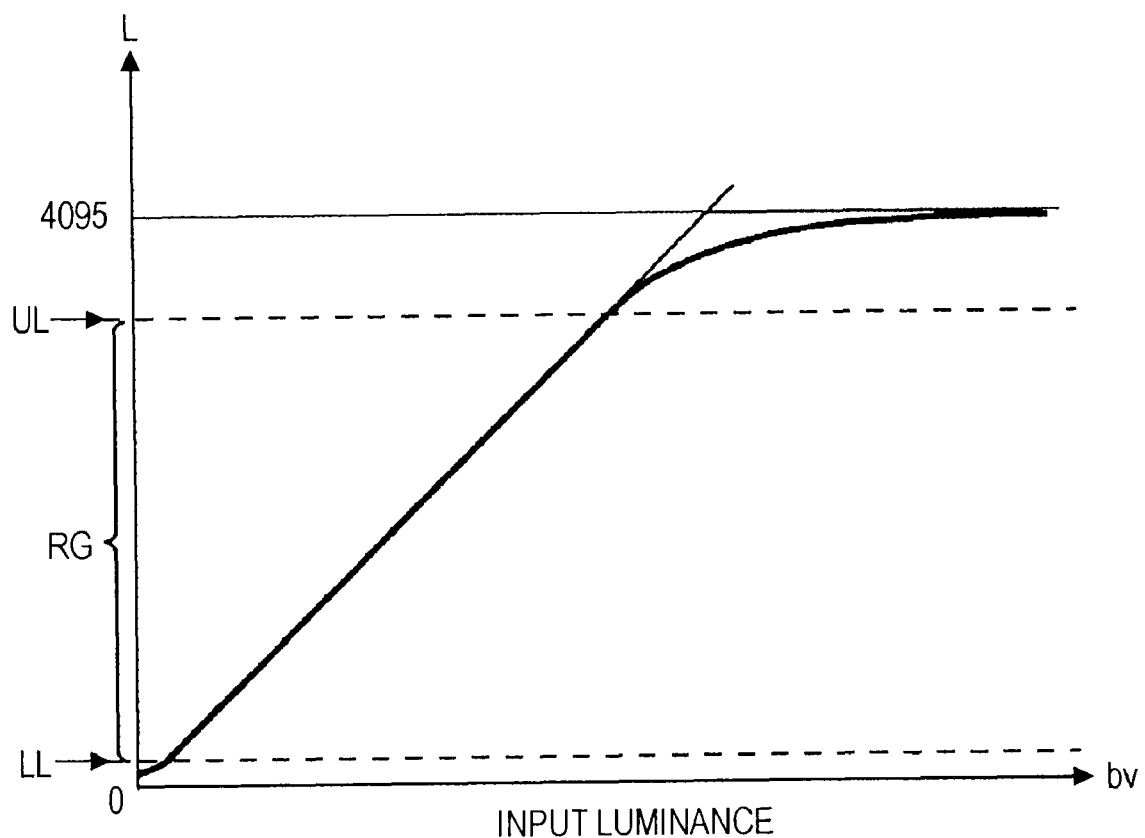
FIG. 16 illustrates a range RG.

FIG. 16 illustrates one example of the range RG. The range RG of FIG. 16 is a range of output values within which a linearity is assured in the input-output relationship of the imaging element 7, out of the overall output range of the value L.

The range RG has an upper limit UL (for example, "3500" in a 12-bit representation) and a lower limit LL ("100" in a 12-bit representation). If the imaging apparatus 1 starts or resumes the exposure control with a value higher than the upper value UL or lower than the lower value LL, the time to arrive at the stable state, TA, becomes particularly long (see FIG. 9).

If it is determined that the value L of the exposure image of the imaging element 7 is outside the range RG, the exposure control values (Tv, Av, Sv) may be determined based on the light measurement value bv of the light sensing detector 79.

Figure 17:
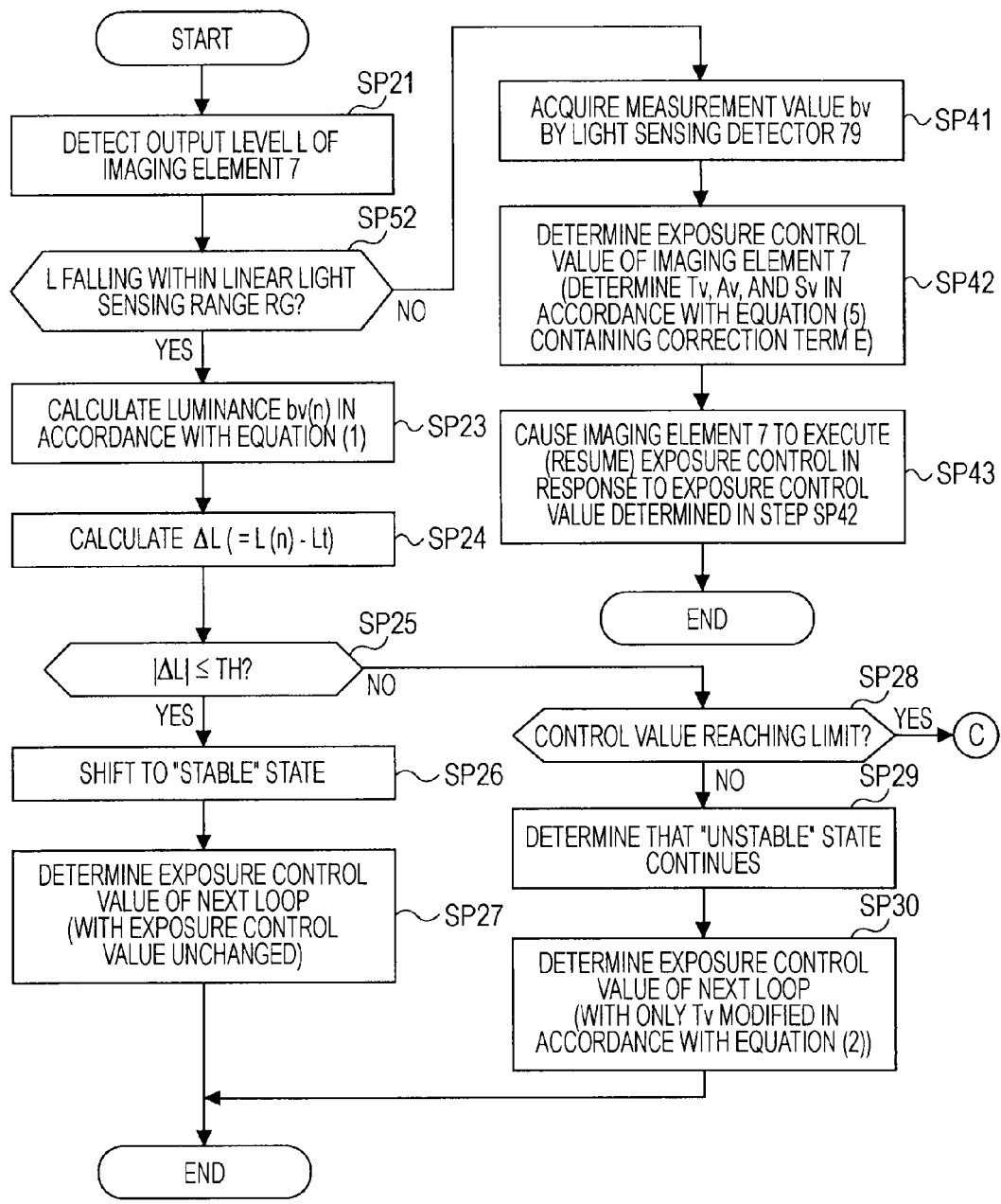
FIG. 17 is a flowchart illustrating a light measurement process according to a modification of the second embodiment of the present invention.

More specifically, a process of FIG. 17 may be performed instead of the process of FIG. 15. More specifically, the imaging apparatus 1 determines in step SP52, inserted in steps SP21 and SP23, whether the value L at a given moment is outside the range RG. If it is determined in step SP52 that the value L is outside the range RG, steps SP41-SP43 are performed. If the value L is outside the range RG within which a linearity is maintained in the input-output relationship of the imaging element 7, the use of steps S41-S43 shortens the time to arrive at the stable state TA.

The embodiments of the present invention have been discussed. The present invention is not limited to the above-described embodiment.

For example, a different situation of the value L of the imaging element 7 (initial value L0) falling far outside the target value Lt, different from those described in connection with the first and second embodiments, is also contemplated.

More specifically, with the imaging apparatus 1 placed in a dark environment, an open time of the electronic shutter of the imaging element 7 becomes relatively long. The sampling time Δt becomes long, and it takes longer time to reach the stable state.

The above-described technique is also applicable in such as a situation. More specifically, if it is determined that one of the light measurement value of the imaging element 7 and the light measurement value of the light sensing detector 79 is equal to or lower than a predetermined value (in a dark environment), the exposure control may be started based on the light measurement value of the light sensing detector 79.

Figure 18:
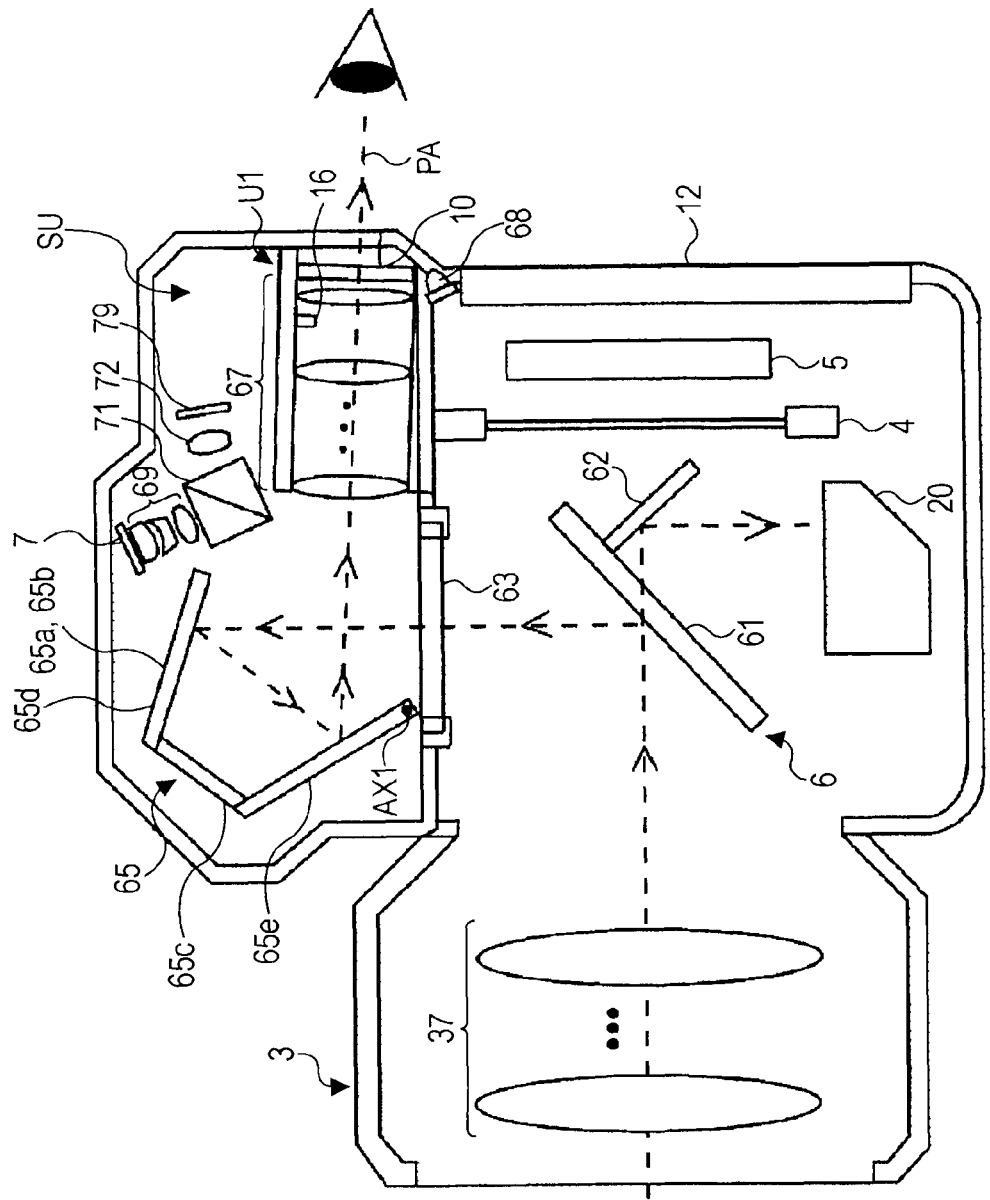
FIG. 18 illustrates an imaging apparatus having an eyepiece sensor.

The imaging apparatus 1 switches between the EVF mode and the OVF mode in response to the switching dial 87 operated by the user. The present invention is not limited to this arrangement. As shown in FIG. 18, an eye-piece sensor 68 for detecting a proximity of an object is arranged close to the eye-piece unit (viewfinder window 10), and the imaging apparatus 1 may automatically switch between the EVF mode and the OVF mode in response to the detection results of the eye-piece sensor 68. More specifically, the imaging apparatus 1 is switched to the EVF mode when the eye-piece sensor 68 detects the proximity of the eye of a user, and is switched to the OVF mode when the eye-piece sensor 68 detects the separation of the eye of the user. In this case, the angle of the mirror 65e may be changed using a motor-driven mechanism or the like.

In the above-described embodiments, the angle of reflection of the mirror 65e is changed to modify the pathway of the observation light beam, and an EVF display is presented. The present invention is not limited this arrangement. The imaging apparatus in the related art provides a live-view image, using the movable reflective mirror retractable from the optical path of the subject image beam arranged in the vicinity of the eyepiece lens 67 of the viewfinder optical system in the optical path. With the technique of the embodiment of the present invention incorporated in the related art imaging apparatus, the light measurement error of the imaging element 7 may be corrected in a light-blocked state in the mirror-up position.

In the above-described embodiments, the present invention is applied to the digital still camera. The present invention is applicable to film cameras. More specifically, a photosensitive surface of a film is placed at the focusing position of the illustrated imaging element 5, which is not actually used in the film camera.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
a viewfinder optical system for guiding an observation light beam to a viewfinder window, the observation light beam being output from an imaging optical system and then reflected from a main reflective surface;
an imaging element for generating an image signal in response to the reception of the observation light beam;
exposure control means for performing exposure control of the imaging element in response to the image signal from the imaging element; and
a light sensing detector for measuring light,
wherein the exposure control means determines an exposure control value in the exposure control in response to a light measurement value provided by the light sensing detector if a predetermined condition is satisfied,
wherein the exposure control means performs the exposure control including feedback control, the feedback control being performed to cause a pixel value of an exposure image provided by the imaging element to approach a target value of the pixel value, and
wherein the exposure control means determines the exposure control value in response to the light measurement value provided by the light sensing detector if a deviation value between the pixel value of the exposure image and the target value of the pixel value is determined to be larger than a predetermined threshold.

2. The imaging apparatus according to claim 1, wherein the exposure control means corrects the light measurement value provided by the light sensing detector, using a correction term related to a difference between the light measurement value provided by the light sensing detector and intrinsic illuminance of a subject, and determines the exposure control value in response to the corrected light measurement value.

3. The imaging apparatus according to claim 1, wherein at the start of the exposure control the exposure control means determines the exposure control value in response to the light measurement value provided by the light sensing detector.

4. The imaging apparatus according to claim 3, wherein the exposure control means determines the exposure control value in response to the light measurement value provided by the light sensing detector if the exposure control is started in response to shifting to a power-on state of the imaging apparatus.

5. The imaging apparatus according to claim 1, wherein the exposure control means determines the exposure control value in response to the light measurement value provided by the light sensing detector if the pixel value of the exposure image falls outside a predetermined range.

6. The imaging apparatus according to claim 5, wherein the predetermined range is an output range within which a linearity is maintained in an input-to-output relationship of the imaging element.

7. The imaging apparatus according to claim 1, further comprising display means for displaying successively a plurality of images acquired in a time-series sequence by the exposure controlled imaging element.

8. An imaging apparatus, comprising:
a viewfinder optical system for guiding an observation light beam to a viewfinder window, the observation light beam being output from an imaging optical system and then reflected from a main reflective surface;
a first imaging element for generating an image signal in response to the reception of the observation light beam;
first exposure control means for performing exposure control of the first imaging element in response to the image signal from the first imaging element;
a light sensing detector for measuring light;
a second imaging element for generating an image signal in response to the reception of the light beam from the imaging optical system; and
second exposure control means for calculating a luminance of a subject in response to the image signal from the first imaging element, and performing exposure control of the second imaging element,
wherein the first exposure control means determines an exposure control value in the exposure control of the first imaging element in response to the light measurement value provided by the light sensing detector if a predetermined condition is satisfied, and
wherein the second exposure control means determines the luminance of the subject in response to the image signal of the first imaging element exposure controlled by the first exposure control means, and performs the exposure control of the second imaging element in response to the luminance of the subject.

9. An imaging apparatus, comprising:
a viewfinder optical system configured to guide an observation light beam to a viewfinder window, the observation light beam being output from an imaging optical system and then reflected from a main reflective surface;
an imaging element configured to generate an image signal in response to the reception of the observation light beam;
an exposure control unit configured to perform exposure control of the imaging element in response to the image signal from the imaging element; and
a light sensing detector configured to measure light,
wherein the exposure control unit determines an exposure control value in the exposure control in response to a light measurement value provided by the light sensing detector if a predetermined condition is satisfied,
wherein the exposure control unit performs the exposure control including feedback control, the feedback control being performed to cause a pixel value of an exposure image provided by the imaging element to approach a target value of the pixel value, and
wherein the exposure control unit determines the exposure control value in response to the light measurement value provided by the light sensing detector if the pixel value of the exposure image falls outside a predetermined range.

10. An imaging apparatus, comprising:
a viewfinder optical system configured to guide an observation light beam to a viewfinder window, the observation light beam being output from an imaging optical system and then reflected from a main reflective surface;
a first imaging element configured to generate an image signal in response to the reception of the observation light beam;
a first exposure control unit configured to perform exposure control of the first imaging element in response to the image signal from the first imaging element;
a light sensing detector configured to measure light;
a second imaging element configured to generate an image signal in response to the reception of the light beam from the imaging optical system; and
a second exposure control unit configured to calculate a luminance of a subject in response to the image signal from the first imaging element, and performing exposure control of the second imaging element,
wherein the first exposure control unit determines an exposure control value in the exposure control of the first imaging element in response to the light measurement value provided by the light sensing detector if a predetermined condition is satisfied, and
wherein the second exposure control unit determines the luminance of the subject in response to the image signal of the first imaging element exposure controlled by the first exposure control unit, and performs the exposure control of the second imaging element in response to the luminance of the subject.

* * * * *